(12) United States Patent
Uenosono et al.

(10) Patent No.: US 7,513,688 B2
(45) Date of Patent: *Apr. 7, 2009

(54) HYDRODYNAMIC BEARING DEVICE AND INSPECTION METHOD OF AMOUNT OF WORKING FLUID

(75) Inventors: Kaoru Uenosono, Ozu (JP); Yosei Yoshikawa, Touon (JP)

(73) Assignee: Panasonic Corporation, Osaka (JP)

( * ) Notice: Subject to any disclaimer, the term of this patent is extended or adjusted under 35 U.S.C. 154(b) by 254 days.

This patent is subject to a terminal disclaimer.

(21) Appl. No.: 11/294,445

(22) Filed: Dec. 6, 2005

(65) Prior Publication Data

US 2006/0126979 A1 Jun. 15, 2006

(30) Foreign Application Priority Data

Dec. 13, 2004 (JP) .............................. 2004-359262

(51) Int. Cl.
*F16C 32/06* (2006.01)

(52) U.S. Cl. ...................................... 384/100; 384/107

(58) Field of Classification Search ................. 384/100, 384/107–124

See application file for complete search history.

(56) References Cited

U.S. PATENT DOCUMENTS

| 4,082,381 | A | * | 4/1978 | Simmons et al. | ............ 384/472 |
| 4,254,961 | A | * | 3/1981 | Fersht et al. | ................ 384/100 |
| 5,715,116 | A | * | 2/1998 | Moritan et al. | .............. 384/107 |
| 7,008,112 | B2 | * | 3/2006 | Yamashita et al. | .......... 384/119 |
| 7,241,050 | B2 | * | 7/2007 | Uenosono et al. | ........... 384/107 |
| 2004/0184689 | A1 | * | 9/2004 | Asada et al. | ................ 384/107 |

FOREIGN PATENT DOCUMENTS

JP 11-82486 3/1999

* cited by examiner

*Primary Examiner*—Thomas R Hannon
(74) *Attorney, Agent, or Firm*—Steptoe & Johnson LLP

(57) ABSTRACT

A hydrodynamic bearing device in a hydrodynamic bearing device in which a sleeve (2) is covered with a cover (5), which is capable of easily confirming that a working fluid is favorably filled between the cover and the sleeve, and easily confirming that an adhesive (21) which bonds the cover and the sleeve is favorably filled, and an inspection method of an amount of the working fluid are provided. By using the cover having translucency, the filled state of the working fluid is visually recognized through the cover, and is confirmed with an image recognition apparatus.

16 Claims, 15 Drawing Sheets

HYDRODYNAMIC BEARING DEVICE AND INSPECTION METHOD OF AMOUNT OF WORKING FLUID

FIELD OF THE INVENTION

The present invention relates to a hydrodynamic bearing device used for a spindle motor or the like which rotationally drives a magnetic disc, an optical disc and the like, and an inspection method of an amount of a working fluid which is filled in the hydrodynamic bearing device.

BACKGROUND OF THE INVENTION

As a bearing device used for a spindle motor or the like of a hard disk device, a hydrodynamic bearing device which is more excellent in rotational accuracy than a ball bearing and also excellent in silentness is frequently adopted in place of a ball bearing device conventionally used.

As a hydrodynamic bearing device of this kind, there is a hydrodynamic bearing device disclosed in, for example, Japanese Patent Laid-Open No. 11-82486. The hydrodynamic bearing device includes a shaft 51, a sleeve 52 which is disposed at an outer periphery via a gap with respect to the shaft 51, and thick thrust flanges 53 and 54 disposed at both ends of the shaft 51 and in such postures as have gaps with respect to both end surfaces of the sleeve 52 as shown in FIG. 17, and a working fluid composed of lubricating oil is held in the gap between an outer peripheral surface of the shaft 51 and an inner peripheral surface of the sleeve 52, and the gaps between inner surfaces of the thrust flanges 53 and 54 (a lower surface of the thrust flange 53 and an upper surface of the thrust flange 54) and both the end surfaces of the sleeve 52 opposed to them. Dynamic pressure grooves 56 are formed on the outer peripheral surface of the shaft 51, and a radial hydrodynamic bearing in which the shaft 51 and the sleeve 52 are rotatably supported via a predetermined gap in a radial direction is constructed by the pressure of the working fluid collected by the dynamic pressure grooves 56 when the shaft 51 and the sleeve 52 are relatively rotated by a rotational driving force of a motor not shown. Dynamic pressure grooves 57 and 58 are formed on the inner surfaces of the thrust flanges 53 and 54, and a thrust hydrodynamic bearing in which the shaft 51 and the sleeve 52 are rotatably supported via predetermined gaps in a thrust direction (axial direction) is constructed by the pressure of the working fluid collected by the dynamic pressure grooves 57 and 58 when the thrust flanges 53 and 54 mounted to the shaft 51 and the sleeve 52 are relatively rotated by the above described rotational driving force or the like.

In the hydrodynamic bearing device, a plurality of communicating paths 59 extending in parallel with the axis are formed at each proper angle (for example, 180 degrees) around the axis at intermediate spots between the inner peripheral surface and the outer peripheral surface in the sleeve 52. The communicating paths 59 communicate with spaces between the inner surfaces of the thrust flanges 53 and 54 and both the end surfaces of the sleeve 52 opposed to them. Fluid closing members 60 and 61 are fitted in both end inner peripheral parts of the sleeve 52 so as to oppose to the outer peripheral surfaces of the thrust flanges 53 and 54 with gaps. Conical inclined surfaces 60a and 61a are formed at the areas of the fluid closing members 60 and 61 opposed to the communicating paths 59, and areas facing the inclined surfaces 60a and 61a are set as fluid storage spaces 64 and 65 in which the working fluid is stored. Between the outer peripheral surfaces of the thrust flanges 53 and 54 and the inner peripheral surfaces of the fluid closing members 60 and 61, the aforementioned gaps are formed and communicate with external air (atmospheric pressure), and fluid sealing parts 62 and 63 which seal the working fluid inside the hydrodynamic bearing device by utilizing the surface tension of the working fluid are provided.

Even when the pressure of the working fluid becomes unbalanced and a pressure difference occurs in the space between the outer peripheral surface of the shaft 51 and the inner peripheral surface of the sleeve 52 where the radial hydrodynamic bearing is formed, and in the spaces between the inner surfaces of the thrust flanges 53 and 54 and both the end surfaces of the sleeve 52 opposed to them, the pressure difference is eliminated by forming the communicating paths 59 as described above. Namely, even when the pressure of the working fluid becomes unbalanced by the construction provided with the communicating paths 59, the bearing function is stabilized and the working fluid is prevented from scattering outside by adjusting the pressure so as to eliminate the pressure difference in the working fluid.

In a general hydrodynamic bearing device of this kind, the gap where the radial hydrodynamic bearing is formed, and the gaps where the thrust hydrodynamic bearing is formed are extremely small, and therefore, in the operation of assembling the hydrodynamic bearing device and filling the working fluid into the hydrodynamic bearings, the working fluid is filled into the inside of the hydrodynamic bearing device so as to be favorably filled into the inside. However, with such an effort, a part of air sometimes remains in the space between the outer peripheral surface of the shaft 51 and the inner peripheral surface of the sleeve 52 where the radial hydrodynamic bearing is formed and in the spaces between the inner surfaces of the thrust flanges 53 and 54 and both the end surfaces of the sleeve 52 opposed to them where the thrust hydrodynamic bearing is formed. In addition, small bubbles are sometimes wrapped up and included in the working fluid when the hydrodynamic bearing device is rotating. When air is included inside as bubbles and attached to the dynamic pressure groove 56 of the radial hydrodynamic bearing and the dynamic pressure grooves 57 and 58 of the thrust hydrodynamic bearing like this, a feeding amount of the working fluid by the dynamic pressure grooves 56, 57 and 58 becomes small, and problem of reduction in bearing stiffness due to bubbles, and reduction in bearing performance such as instability of rotation at the time of rotational operation and the like are caused.

DISCLOSURE OF THE INVENTION

The present invention is to solve the above described problems and an object of the present invention is to provide a hydrodynamic bearing device that is a hydrodynamic bearing device which includes a circulating function of a working fluid by supplying the working fluid between a cover and a sleeve via a circular communicating path, and which can easily confirm that the working fluid is favorably filled between the cover and the sleeve, and can easily confirm that an adhesive which bonds the cover and the sleeve is favorably filled, and an inspection method of an amount of the working fluid.

In order to solve the above-described problems, an inspection method of an amount of a working fluid of a hydrodynamic bearing device of the present invention relates to an inspection method of an amount of a working fluid of a hydrodynamic bearing device for inspecting the amount of the working fluid, in a hydrodynamic bearing device in which a shaft is inserted into a bearing hole of a sleeve in a relatively rotatable posture via a very small gap, dynamic pressure grooves are formed on at least one of surfaces of the shaft and the sleeve opposed to each other, the working fluid is filled into the aforesaid very small gap, and the shaft is supported relatively rotatably with respect to the sleeve. At least one end surface of the sleeve is covered with a cover with a space therebetween, a fluid storage space part which supplies the working fluid to the aforesaid very small gap is formed between the cover and the sleeve, and an amount of the working fluid is detected based on an area defined by a gas-to-liquid boundary line of the working fluid and air in the space part. As one example of this, the cover is formed into a shape in which a depth in an axial direction of the fluid storage space part gradually changes in a circumferential direction, and in this space part, the amount of the working fluid is detected based on a position of an gas-to-liquid boundary line of the working fluid and air, which increases and decreases in the circumferential direction.

According to the inspection method, the amount of the working fluid can be confirmed at a glance at the position of the gas-to-liquid boundary line in which the amount of the working fluid can be visually recognized through the cover. Therefore, anybody can confirm operation omission. When the amount of the working fluid is adjusted by sucking and wiping, the operator can perform the operation while directly confirming the position of the gas-to-liquid boundary line, therefore making it possible to perform fine adjustment, and making it possible to accurately manage the useful life of the bearing to be produced.

A hydrodynamic bearing device of the present invention is a hydrodynamic bearing device including a shaft, a sleeve in which the shaft is inserted in a relatively rotatable posture via a very small gap, and a cover which is fixed to the sleeve and covers an end surface of the sleeve in a posture having a space, in which dynamic pressure grooves which support the shaft relatively rotatably with respect to the sleeve are formed on at least one of surfaces of the shaft and the sleeve opposed to each other, and a working fluid is filled into spaces in the sleeve including a space between the cover and the sleeve, and is characterized in that at least a part of the cover has translucency.

A hydrodynamic bearing device of the present invention is a hydrodynamic bearing device including a shaft, a sleeve which has a bearing hole having an open end that opens and a closed end that is closed, with the shaft inserted into the bearing hole in a rotatable posture via a gap, and a cover which is fixed to the sleeve by an adhesive and covers an open end side end surface of the sleeve in a posture having a space, in which radial dynamic pressure grooves which support the shaft in a radial direction without contact to be relatively rotatable with respect to the sleeve are formed on at least one of an outer peripheral surface of the shaft and an inner peripheral surface of the sleeve where the shaft and the sleeve face each other, a circular communicating path which provides communication between a space area of the closed end surface side in the sleeve and an open end side space area between the cover and the open end side end surface of the sleeve is formed in the sleeve, and the working fluid is filled into spaces in the sleeve including the open end side space area between the cover and the sleeve, and when the shaft is relatively rotated with respect to the sleeve, the working fluid is circulated through a space between the shaft and the sleeve, the space area of the aforesaid closed end side which communicates with this space, the aforesaid circular communicating path communicating with this space area of the closed end side, and the open end side space area between the cover and the sleeve, which communicates with this circular communicating path, and the hydrodynamic bearing device is characterized in that at least a part of the cover has translucency.

According to this construction, after the working fluid is filled between the cover and the sleeve, the filled state of the working fluid can be easily recognized visually through the cover, and can be confirmed by an image recognition apparatus, and even when bubbles attach to the back surface of the cover, the bubbles can be easily detected.

The present invention is characterized in that the cover is formed into a shape in which a depth in an axial direction of the fluid storage space part gradually changes in a circumferential direction.

According to this construction, the gas-to-liquid boundary line is extended with the area of the largest depth as the center, and the gas-to-liquid boundary line can be easily recognized.

Accordingly, the present invention is characterized in that the working fluid is colored.

According to this construction, the working fluid is easily recognized, and the working fluid can be favorably and easily recognized especially in the area in which the thickness of the filled area of the working fluid is thin.

The present invention is characterized in that the cover is fixed to the sleeve by an adhesive, and the adhesive of a color which is different from that of the working fluid and visually recognizable is used.

According to this construction, as for not only the working fluid but also the adhesive, the filled area can be easily confirmed while easily discriminating it from the working fluid.

In the management by the conventional measurement of the liquid level of the fluid storage space part in the height direction, an operator cannot recognize the height of the liquid level at a glance, and has to pay sufficient attention to operation omission. On the other hand, according to the inspection method of the amount of the working fluid of the hydrodynamic bearing device of the present invention, the amount of the working fluid can be confirmed at a glance by the difference of the area on the plane, and therefore, anybody can confirm operation omission. In addition, when the operator adjusts the amount of the working fluid by sucking or wiping, the operator can perform an operation while directly confirming the amount, therefore making it possible to perform fine adjustment and making it possible to accurately manage the useful life of the bearing to be produced.

According to the hydrodynamic bearing device of the present invention, by using the cover having translucency, the filled state of the working fluid can be easily recognized visually through the cover, and can be confirmed with an image recognition apparatus. Thus, even when bubbles attach to the back surface of the cover, they can be easily detected. Thereby, insufficient filling of the working fluid to the hydrodynamic bearing device and inclusion of bubbles into the hydrodynamic bearing device can be inspected without much labor and time, and shipment of the hydrodynamic bearing device of which bearing performance and useful life cannot be guaranteed due to inclusion of bubbles or the like can be prevented, whereby reliability can be enhanced.

By using the colored working fluid, the working fluid can be favorably and easily confirmed even in such area where the space in which the working fluid is filled is narrow.

As the adhesive with which the cover is bonded, the adhesive of the color different from that of the working fluid and visually recognizable is used, and thereby, as for not only the working fluid but also the adhesive, the filled area can be easily confirmed while easily discriminating it from the working fluid. As a result, the hydrodynamic bearing device having the possibility that the working fluid leaks outside and the hydrodynamic bearing device of which circulating function is bad can be prevented from being shipped, and reliability can be enhanced.

Since the cover is formed into the shape in which the depth of the fluid storage space part in the axial direction gradually changes in the circumferential direction, the gas-to-liquid boundary line can be stably recognized, and inspection can be quickly and easily performed.

DESCRIPTION OF THE EMBODIMENTS

Hereinafter, a hydrodynamic bearing device and an inspection method of an amount of a working fluid according to embodiments of the present invention will be described based on the drawings. In the embodiments, a case where the hydrodynamic bearing device is used in a spindle motor of a hard disk device will be described.

Embodiment 1

Figure 1:
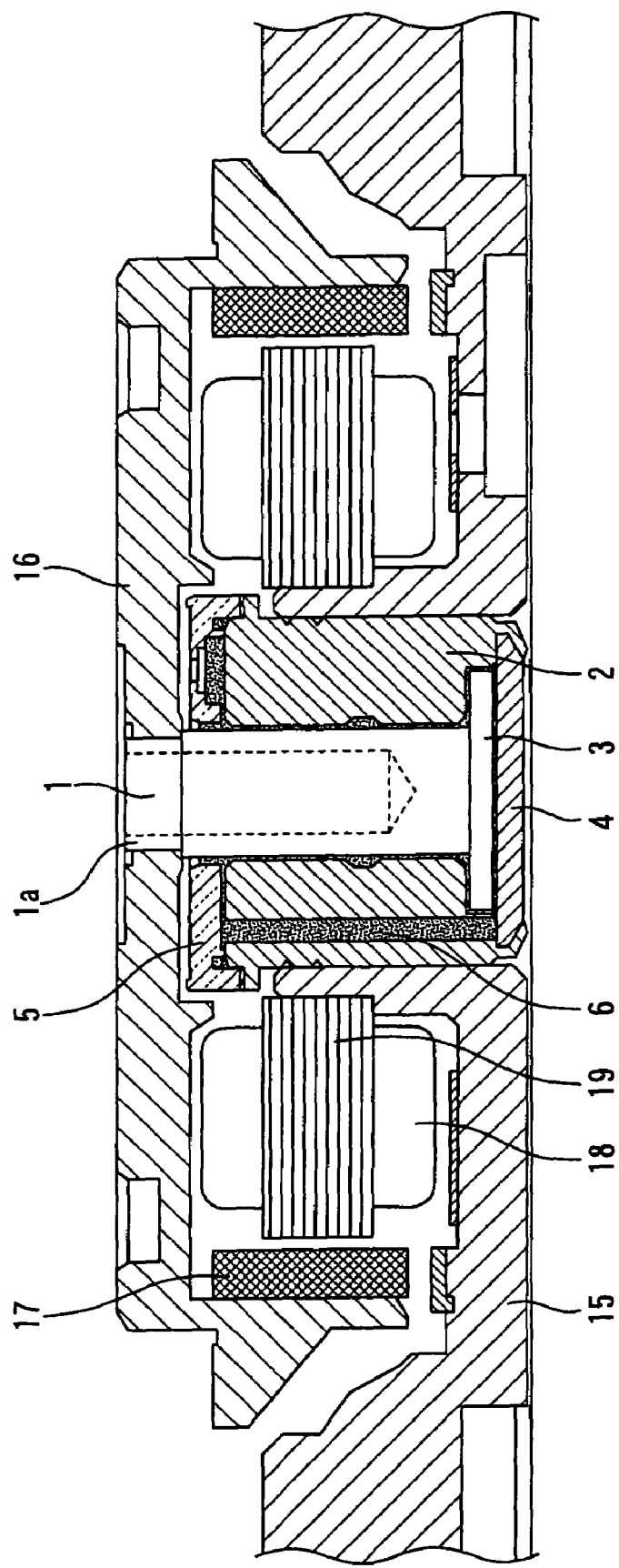
FIG. 1 is a sectional view of a spindle motor including a hydrodynamic bearing device according to embodiment 1 of the present invention.
Figure 2A:
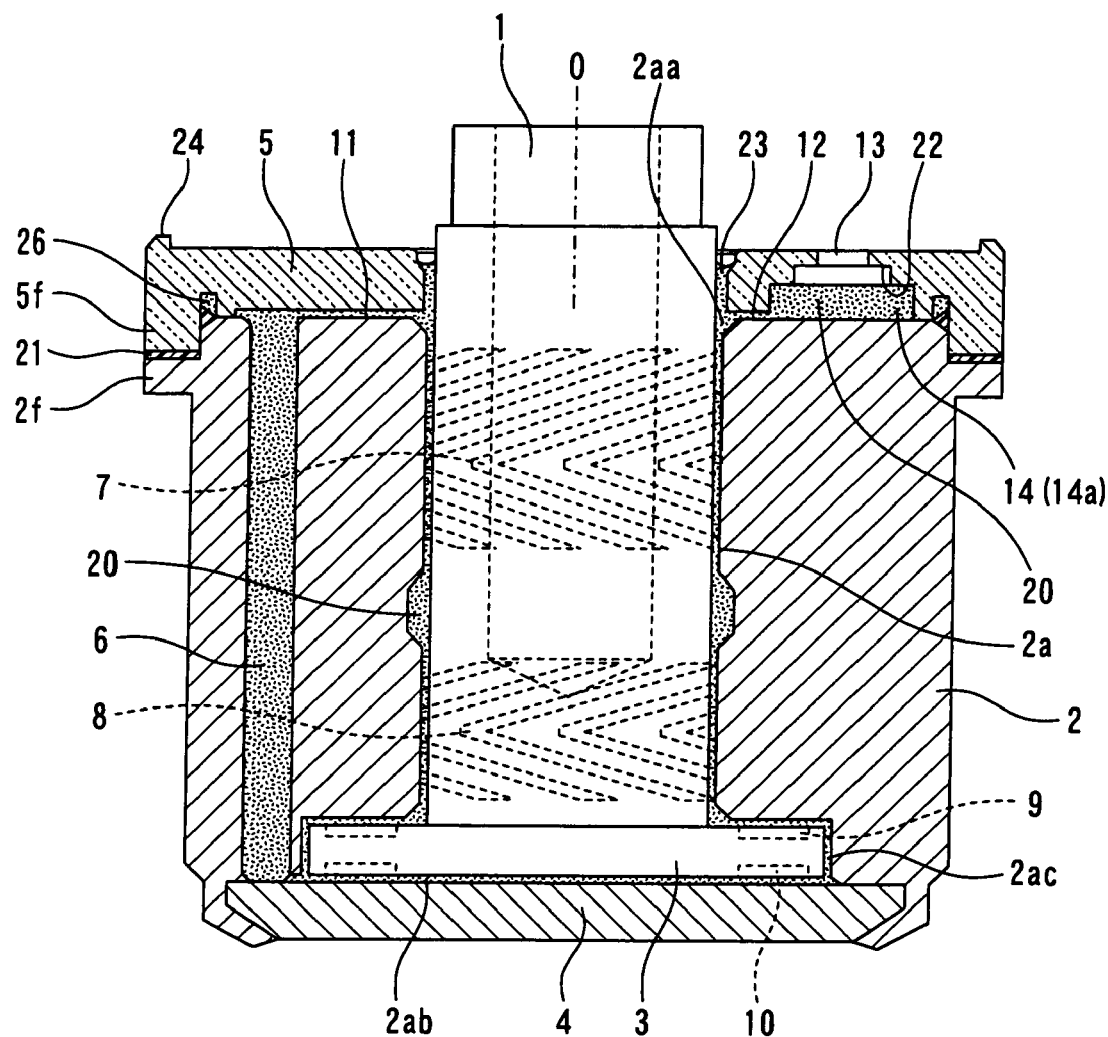
FIG. 2A is a sectional view of the same hydrodynamic bearing device.
Figure 2B:
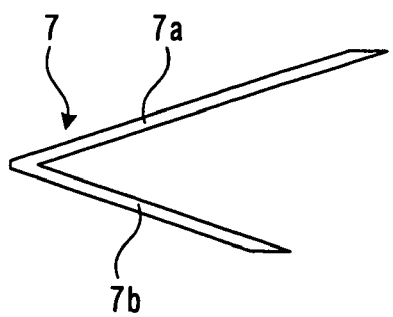
FIG. 2B is a view showing one dynamic pressure groove of the same hydrodynamic bearing device.
Figure 3:
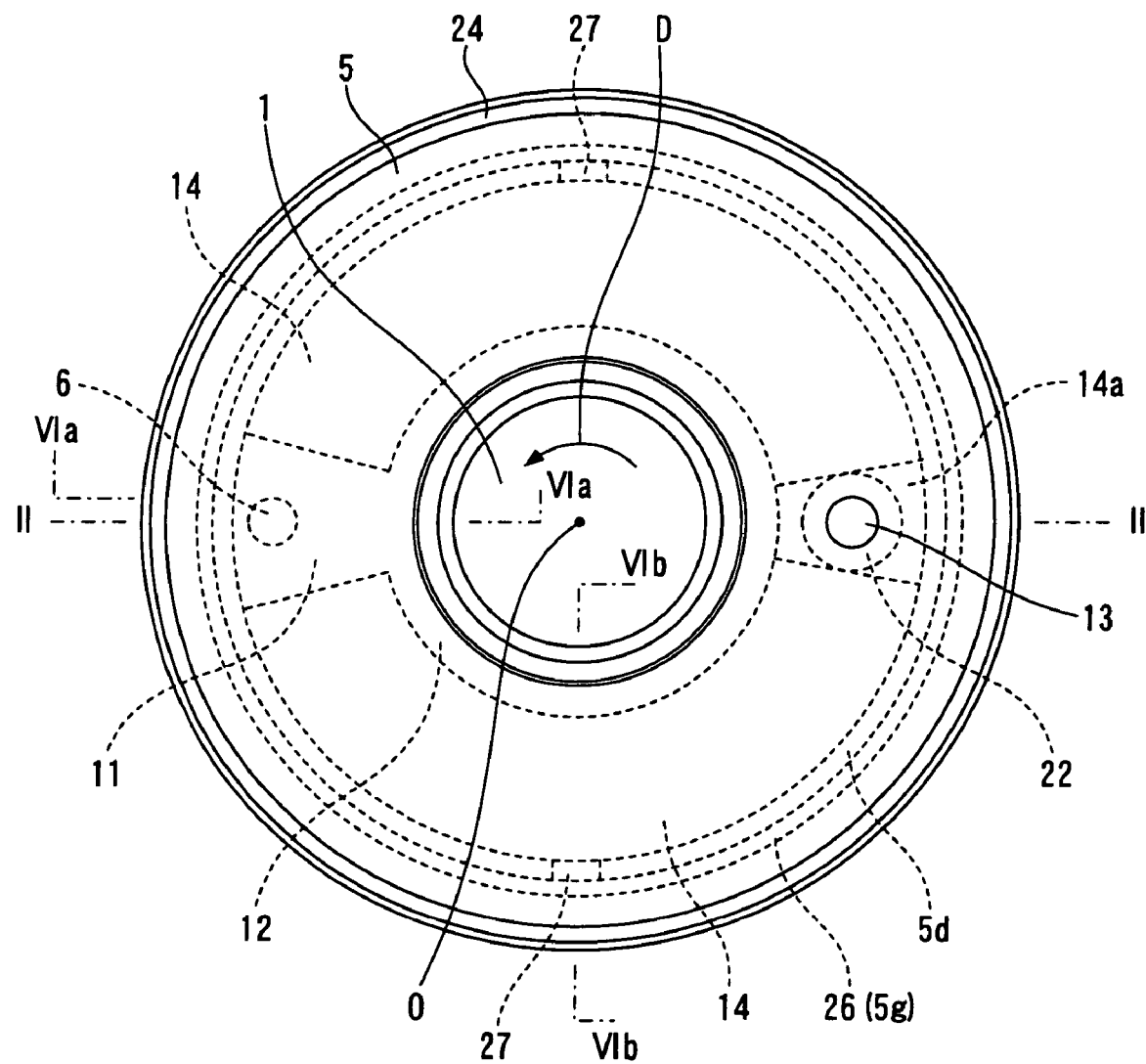
FIG. 3 is a plane view of the same hydrodynamic bearing device.

FIG. 1 is a sectional view of a spindle motor including the hydrodynamic bearing device according to an embodiment of the present invention, FIG. 2A is a sectional view of the same hydrodynamic bearing device, FIG. 3 is a plane view of the same hydrodynamic bearing device, and FIG. 2A is a sectional view taken along the line II to II in FIG. 3. In the following explanation, to facilitate the understanding, the case where an open end in a bearing hole of a sleeve is placed at an upper position and a closed end is placed at a lower position is described as shown in FIGS. 1 and 2, but it goes without saying that in the case of actual use, the placement is not limited to this placement.

As shown in FIGS. 1 to 3, the hydrodynamic bearing device of the spindle motor includes a shaft 1, a sleeve 2, which is fixed to a base 15 of the spindle motor and has a bearing hole 2a having an open end 2aa at an upper side that opens and a closed end 2ab at a lower side that is closed, with the shaft 1 inserted therein in a rotatable posture via a gap (space), a thick thrust flange 3, which is fixed to a lower end portion of the shaft 1 by externally-fitting connection or a screw, and is placed in a thick hole part 2ac at a closed end side in the bearing hole 2a in a posture having a gap with respect to a top surface of the thick hole part 2ac, and a thrust plate 4 fixed to a bottom part of the sleeve 2 to oppose to the thrust flange 3 in a posture having a gap, and in addition to the construction, the hydrodynamic bearing device is provided with a cover 5 which covers the upper end surface (open end side end surface) of the sleeve 2 in a posture having a space, and has a vent hole 13 communicating with external air. In the hydrodynamic bearing device, one circular communicating path 6 (for example, the diameter is about 0.2 mm to 0.6 mm) extending in parallel with an axis O is provided at an area near to an outer peripheral surface in the sleeve 2, and this circular communicating path 6 provides communication between the thick hole part 2ac (space area at the closed end surface side) provided at the side of the closed end 2ab of the bearing hole 2a and a space area (called an open end side space area) between the cover 5 and the upper end surface being the end surface at the open end (2aa) side of the sleeve 2.

A working fluid 20 such as lubricating oil or ionic liquid is filled in inner spaces in the sleeve 2 (namely, a space between an outer peripheral surface of the shaft 1 and an inner peripheral surface of the sleeve 2, a space inside the thick hole part 2ac of the bearing hole 2a, a space in a communication portion between the thick hole part 2ac of the bearing hole 2a and the circular communicating path 6, a space in the circular communicating path 6, an open end side space area between the upper end surface of the sleeve 2 and the cover 5 (except for the location of the vent hole 13)) including a space between the cover 5 and the sleeve 2. As enlarged and shown in FIG. 2A, a working fluid storage part 23 which is formed to expand to the open side and communicates with external air to store the working fluid 20 is formed in an inner peripheral surface of the cover 5, which faces the shaft 1. The sleeve 2 and the cover 5 are fixed with an adhesive 21.

Two dynamic pressure grooves 7 and 8 each in a herringbone pattern or the like are formed at an upper and a lower positions on the inner peripheral surface of the sleeve 2 (or may be provided on the outer peripheral surface of the shaft 1, or may be provided on both the inner peripheral surface of the sleeve 2 and the outer peripheral surface of the shaft 1), and a radial hydrodynamic bearing in which the shaft 1 and the sleeve 2 are rotatably supported via a predetermined gap in a radial direction (radius direction) is constructed by the pressure of the working fluid 20 collected by the dynamic pressure grooves 7 and 8 when the shaft 1 and the sleeve 2 are relatively rotated by a rotational driving force that will be described later. Dynamic pressure grooves 9 and 10 each in a spiral pattern or the like are formed on an upper surface and a lower surface of the thrust flange 3 (or they may be provided on a lower surface of the sleeve 2 and an upper surface of the thrust plate 4 opposed to them, or may be provided on all of the upper and the lower surfaces of the thrust flange 3, the lower surface of the sleeve 2 and the upper surface of the thrust plate 4), and a thrust hydrodynamic bearing in which the shaft 1 and the sleeve 2 are rotatably supported via a predetermined gap in the thrust direction (axial direction) is constructed by the pressure of the working fluid 20 collected by the dynamic pressure grooves 9 and 10 when the thrust flange 3 mounted to the shaft 1 and the sleeve 2 are relatively rotated by the aforementioned rotational driving force or the like. In this case, the dynamic pressure grooves 7 and 8 constructing the radial hydrodynamic bearing are formed into the well-known herring-bone shapes, and are formed at two areas in total that are the upper side and the lower side on the outer peripheral surface of the shaft 2. In the dynamic pressure groove 8 at the lower side, grooves formed diagonally upward from its apex and grooves formed diagonally downward are formed in the same lengths. On the other hand, in the dynamic pressure groove 7 at the upper side, a groove 7a formed diagonally upward from its apex is formed to be longer than a groove 7b formed diagonally downward from the apex as shown in FIG. 2B, so that the working fluid 20 in this gap is positively fed downward by the dynamic pressure groove 7 at the upper side at the time of rotational drive. Here, as the method for applying a circulating force to the working fluid, the construction of two radial bearings at the upper side and the lower side is used for explanation, but one radial bearing may be adopted. The circulating force of the working fluid can be applied by the thrust bearing (FIG. 2A). It may be applied by a cone-shaped bearing (conical bearing, taper bearing) having the functions of both the radial bearing and the thrust bearing.

As shown in FIG. 1, a hub 16 as a rotary member with, for example, a magnetic recording disk fitted to its outer periphery is externally fitted in a press-fitted state onto a projected shaft part 1a which is projected from the bearing hole 2a of the sleeve 2 in the shaft 1. In this embodiment, a rotor magnet 17 is mounted to an inner periphery of a part of the hub 16, which is near to the base. A stator core 19 around which a stator coil 18 is wound is mounted to the base 15 to oppose to the rotor magnet 17. A rotational drive part of the spindle motor which applies a rotational driving force to between the shaft 1 and the sleeve 2 is constructed by the rotor magnet 17 and the stator core 19.

Here, the shaft 1 is made of stainless steel or high-strength steel. The sleeve 2 is made of a copper material, and nickel plating is applied to a part or an entire of its surface. The hub 16 is made of stainless steel which is excellent in machinability with less outgas and is different from the shaft material. The thrust flange 3 is made of stainless steel which is excellent in pressing easiness and is different from that of the shaft, when the dynamic pressure groove is made by plastic deformation. The thrust plate is made of stainless steel or hard metal capable of being quenched. As for the rotor magnet 17, a resin magnet of a neodymium-iron-boron system is frequently used. As for the base 15, an aluminum alloy to which cation electrodeposition coating is applied, or stainless steel or iron metal to which nickel plating is applied, is used. As for the stator core 19, laminated electromagnetic steel plates to which powder coating or electrodeposition coating is applied are generally used.

Figure 4:
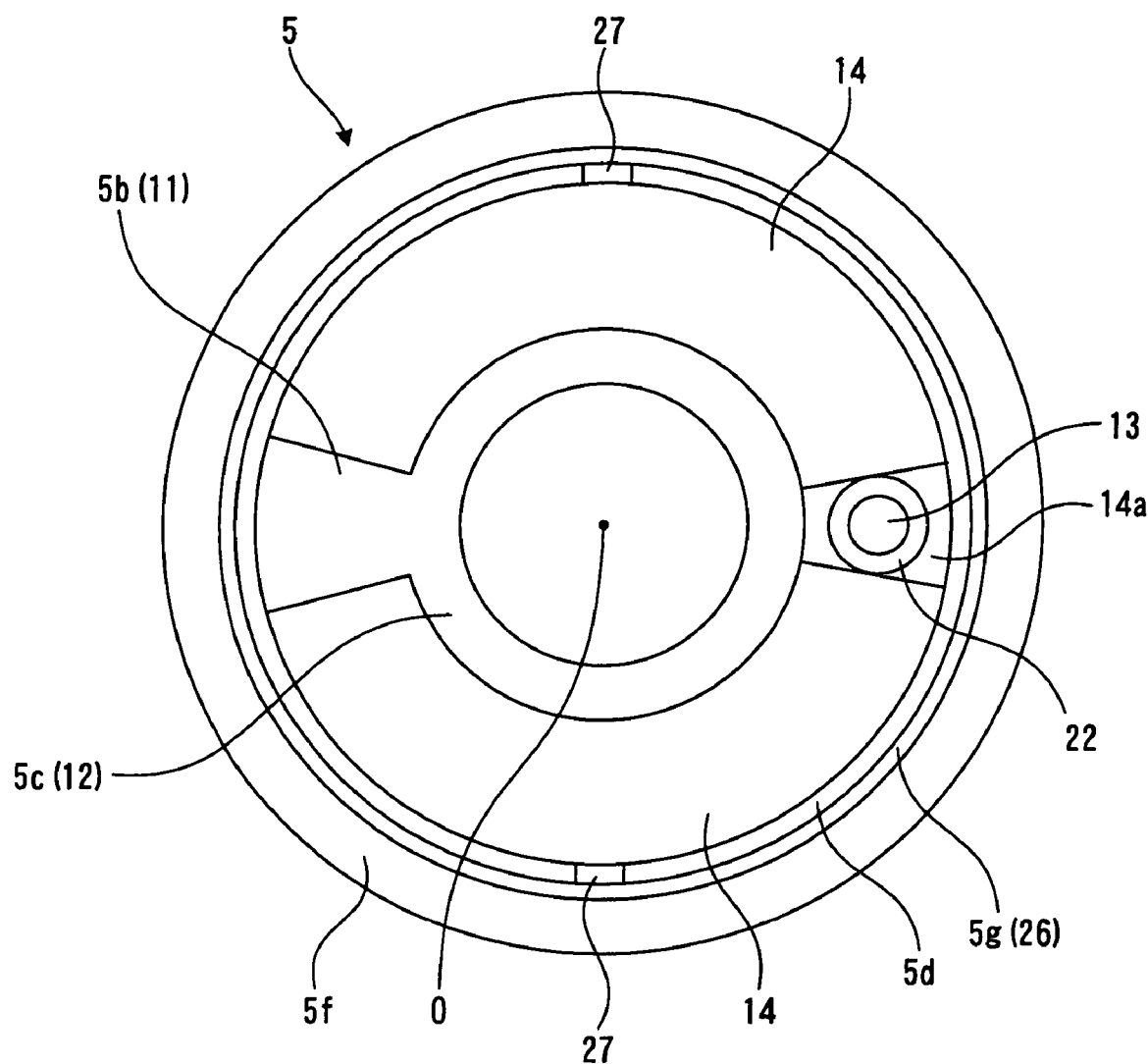
FIG. 4 is a view of a cover of the same hydrodynamic bearing device seen from a back surface.
Figure 5:
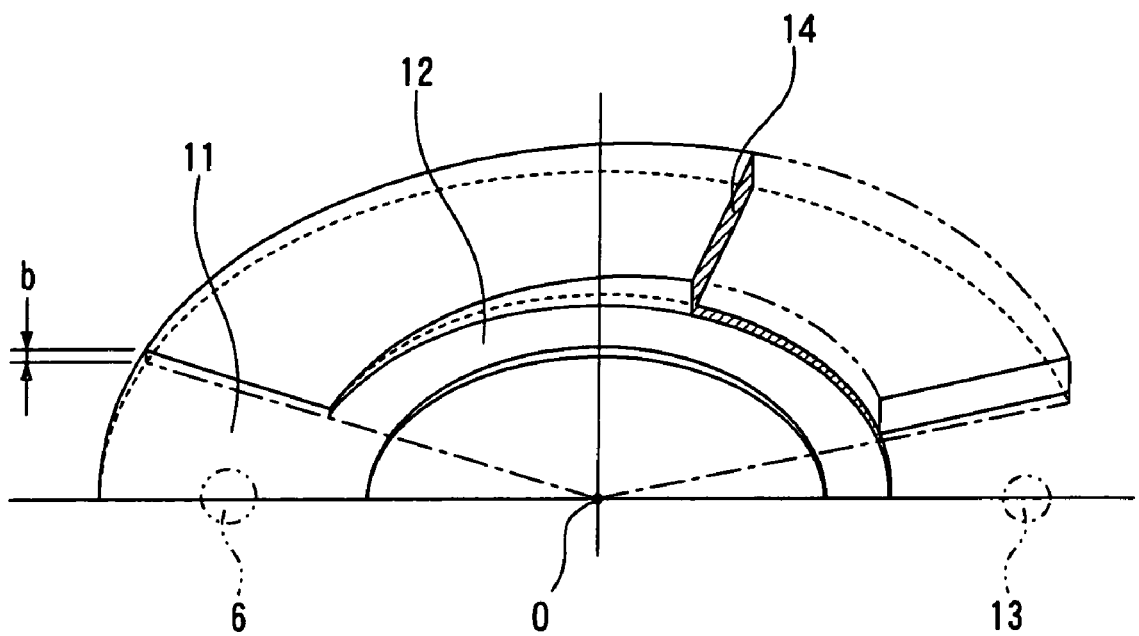
FIG. 5 is a perspective view schematically showing a separation space between a back surface portion of the cover and an upper end surface of a sleeve opposed to this in the same hydrodynamic bearing device.

As shown in FIG. 2A, the upper end surface in the sleeve 2, which is opposed to the cover 5, is in a substantially planar shape. On the other hand, as shown in FIG. 2A, and FIGS. 3 to 5 (in FIG. 5, a separation space between a back surface portion of the cover 5 and the upper end surface of the sleeve 2 opposed to it is schematically shown to facilitate the understanding), the cover 5 is placed so that in its back surface portion, at an area near the opening of the circular communicating path 6 opened in the upper end surface of the sleeve 2 and at an outer peripheral portion near the open end of the bearing hole 2a of the sleeve 2, a separation distance between the corresponding back surface portion of the cover 5 and the upper end surface of the sleeve 2 which is opposed to this is a dimension b (see FIG. 5) which causes capillarity, and gaps through which the working fluid flows into the bearing hole 2a of the inner peripheral surface of the sleeve 2 by capillarity (respectively called an introducing minimum clearance part 11 and a bearing hole outer periphery minimum clearance part 12, and FIG. 4 shows an introducing minimum clearance surface 5b facing the introducing minimum clearance part 11 and a bearing hole outer periphery minimum clearance surface 5c facing the bearing hole outer periphery minimum clearance part 12 in the back surface portion of the cover 5) are formed. The introducing minimum clearance part 11 is formed to continue to the open end of the bearing hole 2a of the sleeve 2 from the area near the opening of the circular communicating path 6 via the bearing hole outer periphery minimum clearance part 12, as shown in FIGS. 3 and 4. In this embodiment, the introducing minimum clearance part 11 is in a substantially sector shape at an open angle of substantially 30 degrees, and is formed in a wider range than the opening of the circular communicating path 6. The diameter of the open end of the bearing hole 2a in the upper end surface of the sleeve 2 is set at, for example, 2.8 mm to 3.2 mm, the bearing hole outer periphery minimum clearance surface 5c is in a circular shape, and is formed to have a width dimension in the radius direction of 0.2 to 0.6 mm from the outer periphery of the open end of the bearing hole 2a. The separation gap of the introducing minimum clearance part 11 and the bearing hole outer periphery minimum clearance part 12 is, for example, 0.03 mm to 0.15 mm. In this embodiment, the separation gap between the introducing minimum clearance part 11 and the bearing hole outer periphery minimum clearance part 12 is also constant in the diameter direction.

The area other than the aforementioned introducing minimum clearance part 11 and the bearing hole outer periphery minimum clearance part 12 in the back surface portion of the cover 5 is recessed to be a larger space than the gaps of the introducing minimum clearance part 11 and the bearing hole outer periphery minimum clearance part 12 to form a fluid storage space part 14 capable of storing the working fluid 20 so as to allow the introducing minimum clearance part 11 to communicate with the vent hole 13 in the circumferential direction. The fluid storage space part 14 is about 3.2 mm to 3.8 mm in inner diameter, 5.5 to 6.3 mm in outer diameter, 0.03 mm to 0.15 mm in the minimum gap, and 0.2 mm to 0.3 mm in the maximum gap, for example. The vent hole 13 is, for example, about 0.2 mm to 1.0 mm in diameter, and a recessed part 22 as a buffer space formed by a spot-facing (for example, about 0.6 mm to 1.0 mm in diameter, 0.1 mm to 0.3 mm in depth) is formed at an area in which the vent hole 13 is provided. The fluid storage space part 14 is formed into a shape inclined with respect to the circumferential direction so that the separation distance from the upper end surface of the sleeve 2 becomes the largest in the area (called a maximum space part 14a) of the fluid storage space part 14 connecting to the vent hole 13 and the recessed part 22, and the separation distance from the upper end surface (open end side end surface) of the sleeve 2 becomes larger as it is closer to the aforementioned maximum space part 14a from the aforementioned introducing minimum clearance part 11. In this embodiment, the separation gap of the fluid storage space part 14 is constant with respect to the diameter direction. In this embodiment, the vent hole 13 which communicates with external air is provided at an area opposite from the opening of the circular communicating path 6 with the axis 0 as a center in the plane view in the cover 5. Reference character D in FIG. 3 denotes a rotational direction of the shaft 1. By forming the recessed part 22 in the aforementioned vent hole 13, an interface of the working fluid 20 remains inside the recessed part 22 and the working fluid 20 does not leak out of the vent hole 13 even when the temperature of the installation environment of the hydrodynamic bearing device rises in the state of full amount of the working fluid 20.

As is enlarged and shown in FIG. 6, the working fluid storage part 23 formed to expand toward the open side in the inner peripheral surface facing the shaft 1 of the cover 5 is formed by an inclined surface which inclines to be narrower toward the lower position and set to be in the shape in which the interface balances in the range in which the interface moves inside the inclined surface in the working fluid storage part 23 even when the working fluid 20 decreases because of evaporation or the like, and the position of the interface (gas-to-liquid boundary line) changes in the area of the fluid storage space part 14.

As shown in FIGS. 2A and 3, a protruding ridge part 24 protruded upward, which is to prevent the working fluid 20 from dropping outside when the working fluid 20 is filled after the hydrodynamic bearing device is assembled, is formed at the upper surface outer peripheral portion of the cover 5. The protruding ridge part 24 is, for example, about 6 mm to 8 mm in inner diameter, and about 0.03 mm to 0.1 mm in height.

In addition to the above described construction, in the present invention, the cover 5 is especially formed of a material having translucency such as transparency and semitransparency, for example, a synthetic resin material such as a polyether-imide resin. As for the working fluid 20, a color recognizable through the cover 5, for example, a color which stands out from the color of the sleeve surface is used.

Figure 6A:
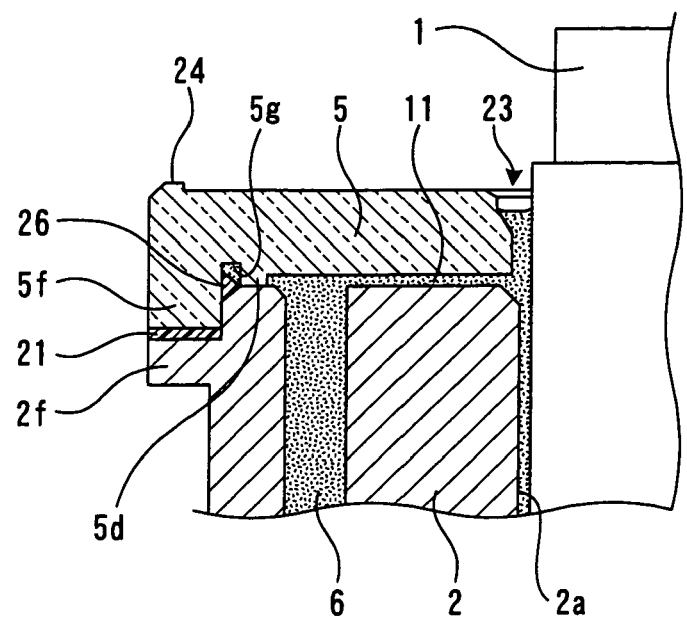
FIG. 6A is a sectional view of a main part of the same hydrodynamic bearing device cut along the line VIa to VIa in FIG. 3.
Figure 6B:
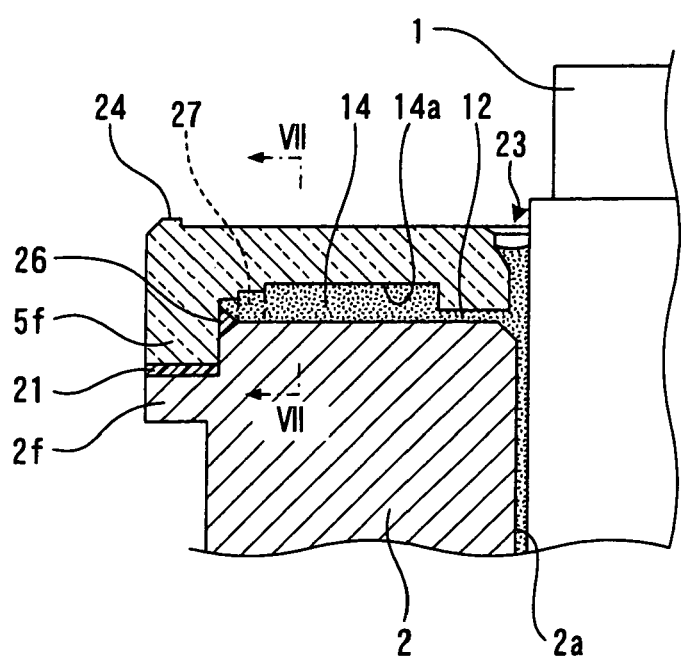
FIG. 6B is a sectional view of a main part of the same hydrodynamic bearing device cut along the line VIb to VIb in FIG. 3.

As shown in FIGS. 6A and 6B, a flange part 2f which projects outside is integrally formed on the entire outer periphery of the upper part of the sleeve 2, and corresponding to this, a flange part 5f which extends downward is integrally formed on the entire outer periphery of the cover 5 so as to face the flange part 2f of the sleeve 2 from above. The sleeve 2 and the cover 5 are fixed at these flange parts 2f and 5f with the adhesive 21. The flange part 2f of the sleeve 2 and the flange part 5f of the cover 5 are formed to have a predetermined gap in the vertical direction so that a relatively large amount of adhesive 21 can be filled in between them, and even when the temperature variation of the installation place of the hydrodynamic bearing device occurs, adhesion function of the area joined by the adhesive 21 can be kept favorable.

At an area between the areas where the flange parts 2f and 5f which function as the adhesive supply bonding parts are provided, and the introducing minimum clearance part 11 and the fluid storage space part 14 filled with the working fluid 20, namely, at the outer peripheral area of a peripheral wall part 5d of the cover 5 in this embodiment, a groove part 5g recessed upward is formed on the entire periphery of the lower surface of the cover 5. A space inside the groove part 5g is set as an adhesive inflow allowing space part 26 which allows the adhesive 21 to flow therein from between the flange parts 2f and 5f.

Figure 7:
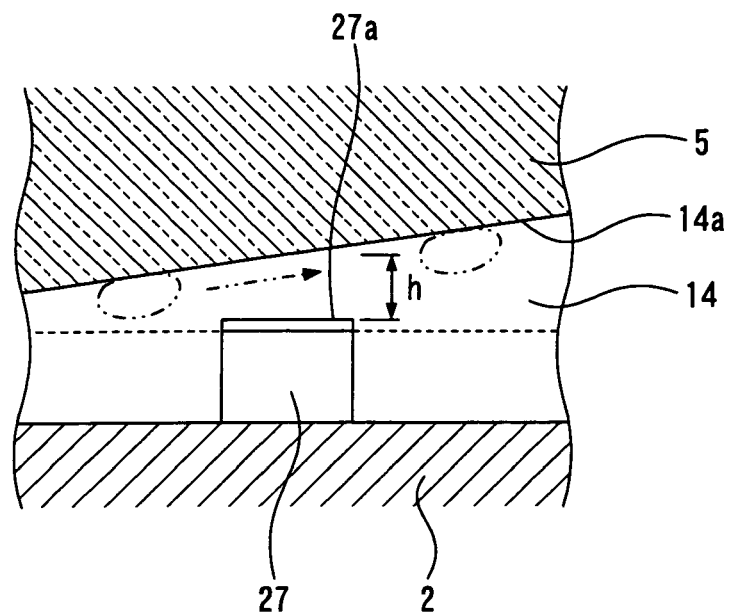
FIG. 7 is a sectional view of a main part of the same hydrodynamic bearing device as seen from the line VII to VII in FIG. 6B.

As shown in FIGS. 3 and 4, a part of the aforementioned peripheral wall part 5d which partitions the fluid storage space part 14 and the adhesive inflow allowing space part 26 in the cover 5 is notched to form a communication part 27. As shown in FIGS. 6B and 7, the communication part 27 is formed at a slightly lower position than a top surface wall portion 14a of the fluid storage space part 14 in the cover 5, and a level difference h is provided between the top surface wall portion 14a of the fluid storage space part 14 which is the back surface of the cover 5 and an upper end portion 27a (see FIG. 7) of the communication part 27.

Next, a step of fixing the cover 5 to the sleeve 2 with the adhesive and a step of filling the working fluid 20 thereafter of the hydrodynamic bearing device provided at the spindle motor will be described.

Figure 8:
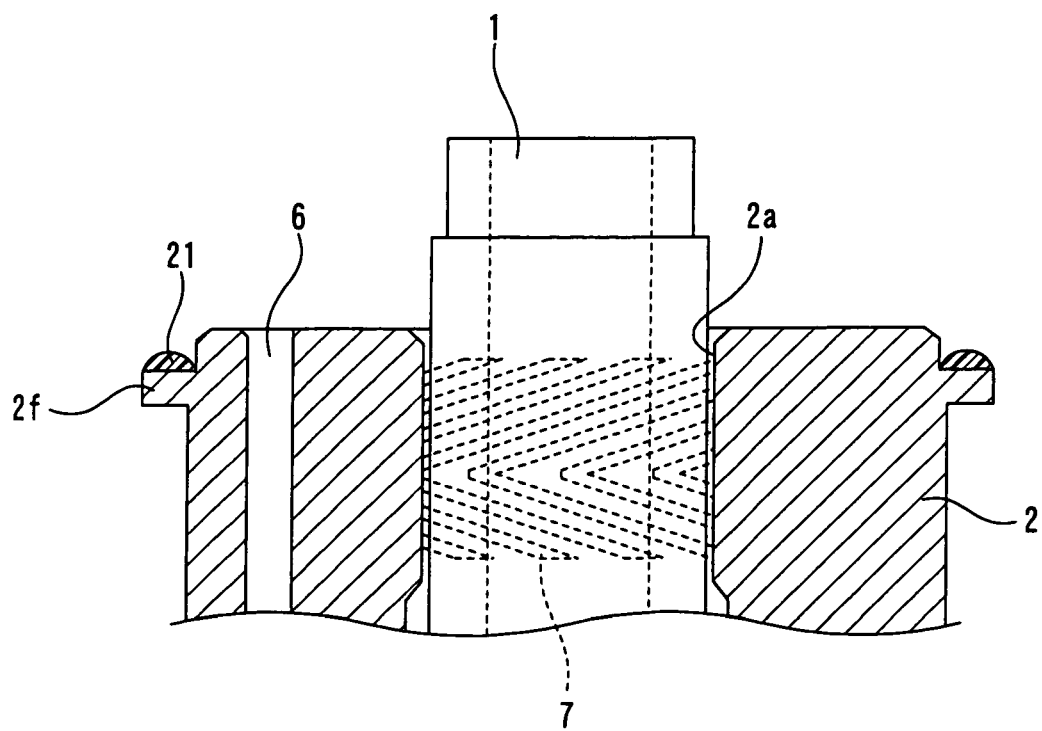
FIG. 8 is a sectional view showing a state in which an adhesive is applied in the same hydrodynamic bearing device.
Figure 9:
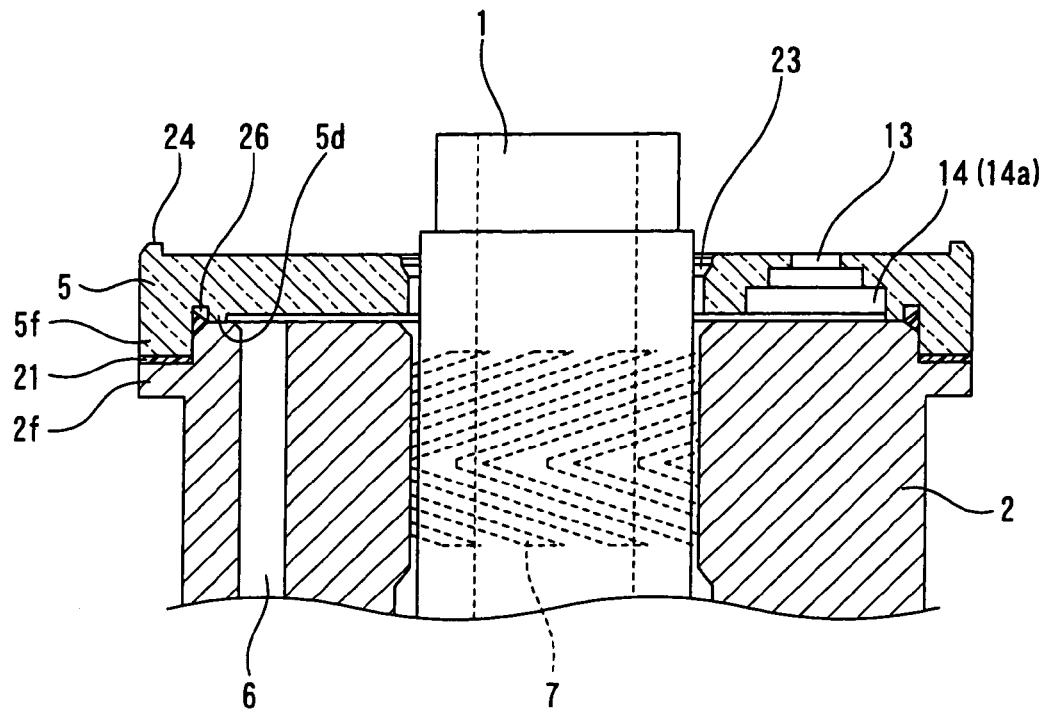
FIG. 9 is a sectional view showing a state in which a cover is put on in the same hydrodynamic bearing device.

As shown in FIG. 8, the adhesive 21 is coated on the flange part 2f of the sleeve 2 first, and thereafter, the cover 5 is put on the sleeve 2 as shown in FIG. 9. Here, a coating amount of the adhesive 21 to the flange part 2f of the sleeve 2 is set as a larger amount than a capacity between the flange part 2f of the sleeve 2 and the flange part 5f of the cover 5, namely, a capacity of the adhesive supply bonding part, so that the adhesive 21 can be reliably supplied to the entire periphery of the gap between the flange part 2f of the sleeve 2 and the flange part 5f of the cover 5.

Figure 10:
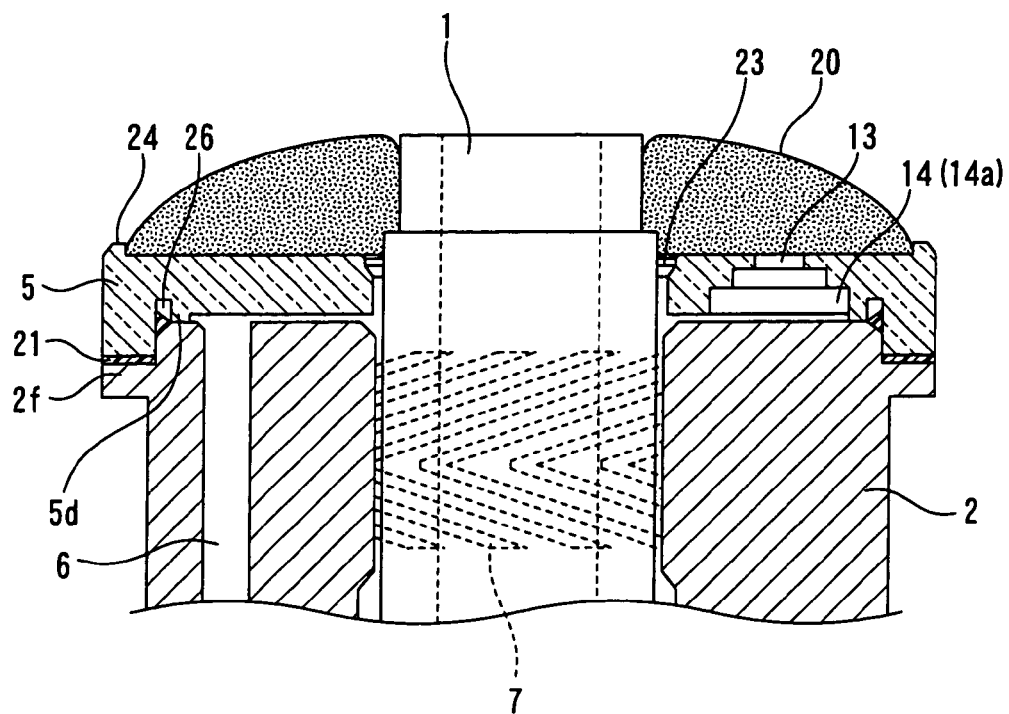
FIG. 10 is a sectional view showing a state in which a working fluid is coated in the same hydrodynamic bearing device.

Thereafter, the sleeve 2 to which the cover 5 and the shaft 1 are assembled is transferred into a vacuum chamber from which air is purged. Then, as shown in FIG. 10, the working fluid 20 is dropped onto the cover 5, and thereafter, external air is introduced into the vacuum chamber, whereby the working fluid 20 is filled into the inside of the hydrodynamic bearing device. In this case, the communication part 27 is formed by notching a part of the aforementioned peripheral wall part 5d which partitions the fluid storage space part 14 in the cover 5 and the adhesive inflow allowing space part 26. Therefore, when the working fluid 20 is filled into the sleeve 2 and between the sleeve 2 and the cover 5 by introducing external air into the vacuum chamber, the working fluid 20 introduced into the fluid storage space part 14 is also filled into a space into which the adhesive 21 does not flow in the adhesive inflow allowing space part 26 through the communication part 27 (see FIGS. 2A, 6A and 6B). Thereby, air can be thereafter prevented from entering the space in which the adhesive 21 does not flow in the adhesive inflow allowing space part 26 when the adhesive 21 is supplied, and the working fluid 20 can be favorably filled into the sleeve 2 and between the sleeve 2 and the cover 5. Accordingly, the problems of the working fluid 20 leaking outside and the like caused by the air entering the adhesive inflow allowing space part 27 and by expansion of the air at the time of rise in temperature and the like are prevented.

After the working fluid 20 is filled into the sleeve 2, and between the sleeve 2 and the cover 5, the hydrodynamic bearing device is taken out of the vacuum chamber, and the filled state of the working fluid 20 in the hydrodynamic bearing device is visually confirmed along the axial direction through the cover 5. Thus, entry of bubbles into the back surface and the like of the internal part of the cover 5, and properness of the fille amount of the working fluid are inspected.

Figure 11A:
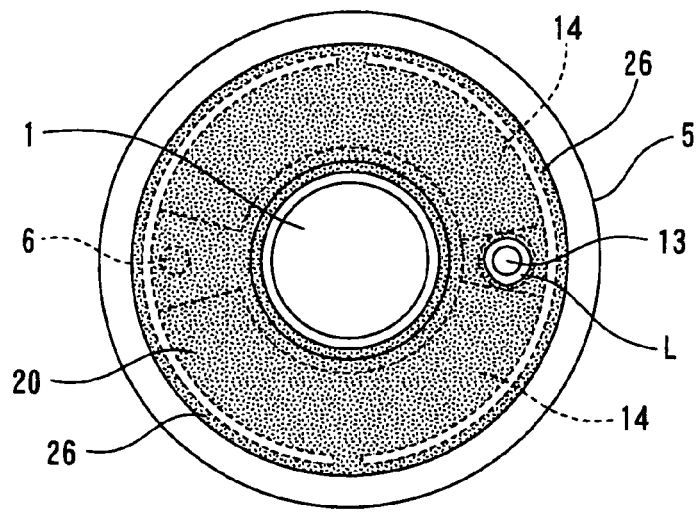
FIGS. 11A to 11C are plan views of the same hydrodynamic bearing device schematically showing the states in which the working fluid and bubbles are seen respectively.

FIG. 11A is the case where the working fluid is filled to a full amount state. In this state, the working fluid inside easily scatters outside by expansion of the working fluid due to rise in temperature and impact. In terms of a useful life, this is advantageous with a large amount of working fluid, but as for the other reliability items, this is disadvantageous and is not preferable.

Figure 12A:
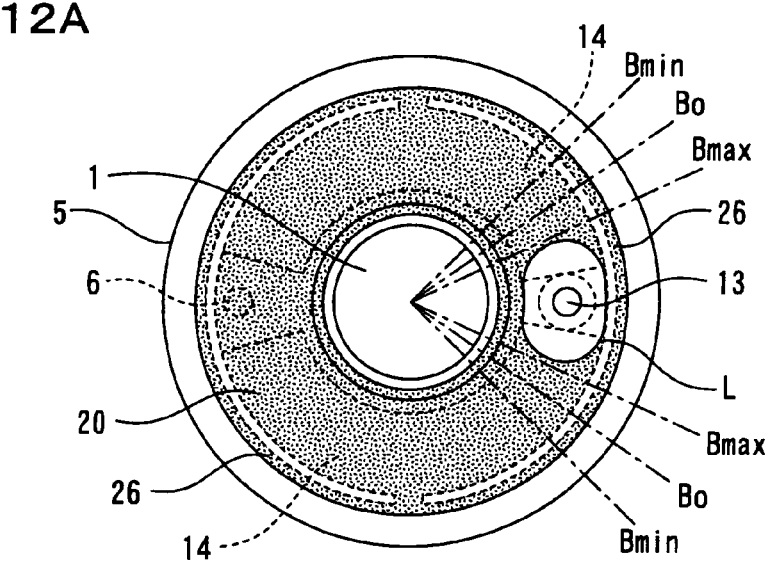
FIGS. 12A to 12C are plan views of the same hydrodynamic bearing device schematically showing the state in which the working fluid and bubbles are seen respectively.
Figure 12B:
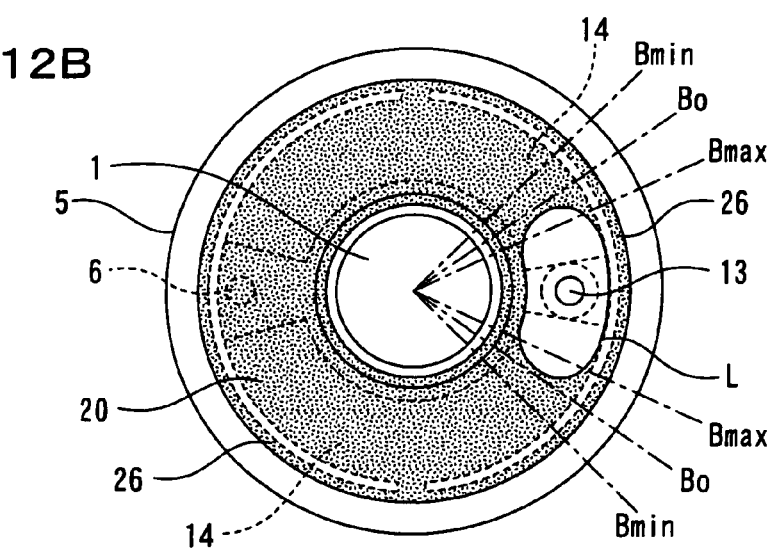
Figure 12C:
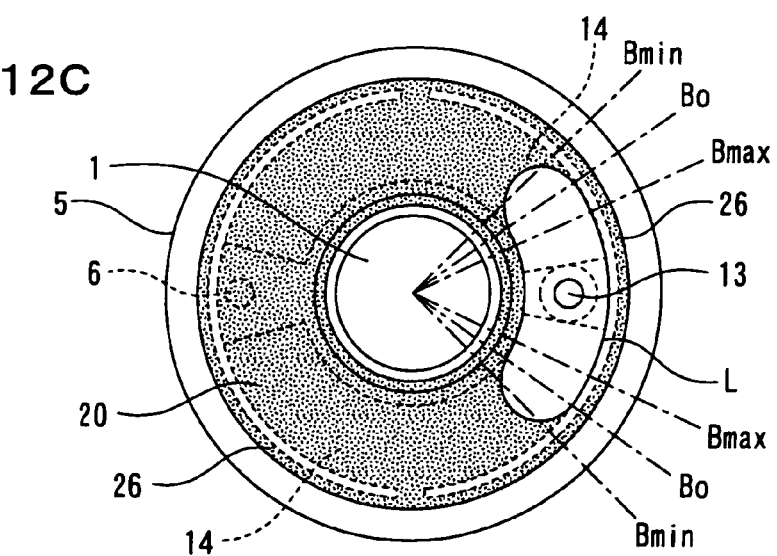

Accordingly, the gas-to-liquid boundary line A of the working fluid 20 and air is adjusted to be between the upper limit value and the lower limit value as shown in FIG. 12B by sucking and wiping out the working fluid 20 from the state in FIG. 11A. FIG. 12A shows the state with excessive working fluid 20, and FIG. 12C shows the state with a too small amount of the working fluid 20. Reference character Bmin denotes a line of the lower limit value of the gas-to-liquid boundary line A, reference character Bmax denotes a line of the upper limit value of the gas-to-liquid boundary line A, and reference character Bo denotes a line of a target value of the gas-to-liquid boundary line A in FIGS. 12A to 12C.

Figure 11B:
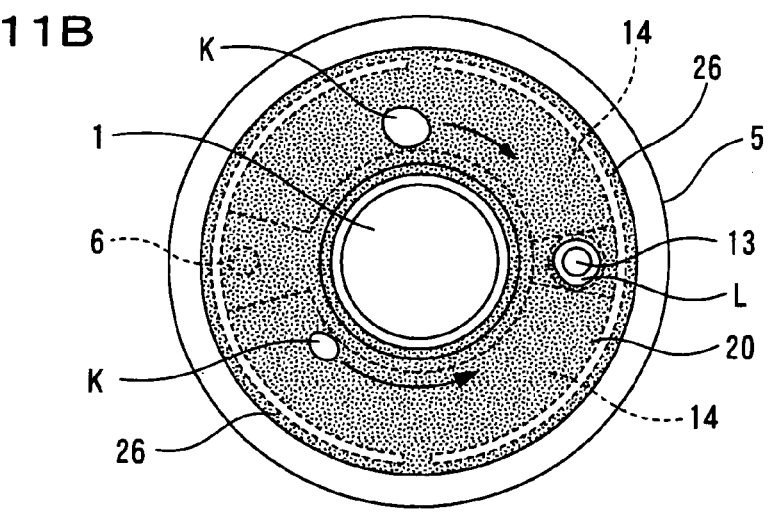
Figure 11C:
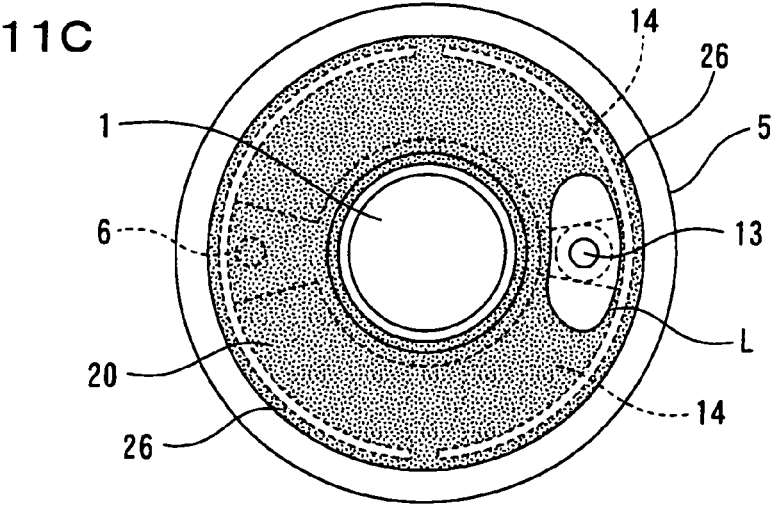

Even if bubbles K are interspersed initially as shown in FIG. 11B, they gather at one spot as shown in FIG. 11C with time because an upper wall of the fluid storage space part 14 inside is inclined, and the bubbles K do not remain interspersed in the working fluid 20.

FIGS. 11A to 11C and FIGS. 12A to 12C schematically show the sate of the hydrodynamic bearing device seen from above.

Thereby, insufficient filling of the working fluid 20 into the hydrodynamic bearing device and inclusion of the bubbles K into the hydrodynamic bearing device can be inspected without requiring much time and labor, the hydrodynamic bearing device reduced in bearing performance and useful life by inclusion of the bubbles K can be prevented from being shipped, and reliability can be enhanced. The useful life of the bearing performance can be stabilized to long time. Since the amount of the working fluid can be confirmed at a glance by the position of the gas-to-liquid boundary line which can be visually confirmed through the cover, anybody can confirm an omission of the operation, and when the amount of the working fluid 20 is adjusted by sucking and wiping, the operator can perform the operation by directly confirming the amount of the working fluid 20. Therefore, fine adjustment is made possible, and the useful life of the hydrodynamic bearing device to be produced can be accurately managed.

Instead of confirmation by eyes of a man who performs the inspection, an image may be obtained by an image recognition apparatus and a filling failure and presence of the bubbles may be automatically determined from the obtained image.

As the working fluid 20, a colored fluid may be used. The working fluid 20 is easily recognized by this construction, and therefore, even when the bubbles K exist in the area where the thickness of the filling area of the working fluid 20 is thin, for example, in the introducing minimum clearance part 11 and the bearing hole outer periphery minimum clearance part 12, the bobbles K can be favorably and easily confirmed.

In the above described construction, when the shaft 1 and the sleeve 2 are relatively rotated by the rotational driving force of the spindle motor, the shaft 1 is supported with a predetermined gap kept with respect to the sleeve 2 by the pressure of the working fluid 20 collected by the dynamic pressure grooves 7 and 8 of the radial hydrodynamic bearing, and by the pressure of the working fluid 20 collected by the dynamic pressure grooves 9 and 10 of the thrust hydrodynamic bearing. The working fluid 20 between the shaft land the sleeve 2 is fed downward by the pressure of the working fluid 20 collected by the dynamic pressure groove 7 of the radial hydrodynamic bearing at the upper side, and with this, the working fluid 20 passes though the space between the thrust flange 3 and the sleeve 2, the space between the sleeve 2 and the thrust plate 4, the space in the circular communicating path 6, the introducing minimum clearance part 11 and the bearing hole outer periphery minimum clearance part 12 in sequence, and flows into the space between the shaft 1 and the sleeve 2 again, and the working fluid 20 positively circulates through these spaces. A part of the working fluid 20 introduced into the introducing minimum clearance part 11 from the circular communicating path 6 flows into the space between the shaft 1 and the sleeve 2 via the bearing hole outer periphery minimum clearance part 12 again while flowing into the fluid storage space part 14.

Accordingly, even when bubbles attach to the dynamic pressure grooves 7 and 8 of the radial hydrodynamic bearing and the dynamic pressure grooves 9 and 10 of the thrust hydrodynamic bearing, and the like, the bubbles detach from the dynamic pressure grooves 7 and 8, the dynamic pressure grooves 9 and 10 and the like and circulate by the aforementioned circulating flow, and when the bubbles pass through the introducing minimum clearance part 11 from the circular communicating path 6, the bubbles flow into the fluid storage space part 14 at a low pressure. When the bubbles flows into the fluid storage space part 14 at a low pressure, the sizes of the bubbles become large, and they hardly enter the introducing minimum clearance part 11 and the bearing hole outer periphery minimum clearance part 12 at a high pressure again. The bubbles are separated from the working fluid 20 in the fluid storage space part 14 and released from the vent hole 13.

Thus, according to this construction, the bubbles in the working fluid 20 are released at the normal rotational driving time, as a result of which, reduction in the bearing stiffness due to the bubbles, reduction in the bearing performance such as instability of rotation at the time of rotating operation can be prevented, and reliability can be enhanced.

According to the hydrodynamic bearing device, not only the working fluid storage part 23 is provided in the inner peripheral surface facing the shaft 1 of the cover 5, but also the fluid storage space part 14 with a large capacity is provided between the sleeve 2 and the cover 5. Accordingly, even when the working fluid of the fluid storage space part 14 decreases, the circulating function can be maintained as long as the working fluid 20 is filled in the introducing minimum clearance part 11 and the bearing hole outer periphery minimum clearance part 12.

According to the present invention, the fluid storage space part 14 is formed into the shape inclined with respect to the circumferential direction so that the separation distance from the top surface which is the open end side end surface of the sleeve 2, becomes larger as it is closer to the maximum space portion 14a provided with the vent hole 13 from the introducing minimum clearance part 11, and therefore, even when the hydrodynamic bearing device receives impact from the outside or abruptly changes in posture, the interface of the air and the working fluid 20 in the fluid storage space part 14 remains in the area near the vent hole 13, and is prevented from moving in the circumferential direction, as a result of which, the advantage of being capable of preventing the working fluid 20 from leaking outside with the movement of bubbles is provided. Further, since the cover is formed into the shape in which the depth of the fluid storage space part 14 in the axial direction gradually changes in the circumferential direction, the gas-to-liquid boundary line L can be easily recognized with the area provided with the vent hole 13 as the center in the plane view, and inspection can be quickly and easily performed.

Since the bearing hole outer periphery minimum clearance part 12 which causes capillary is also formed at the outer peripheral part near the bearing hole open end between the back surface of the cover 5 and the top surface of the sleeve 2, the advantage that the working fluid 20 which is introduced from the introducing minimum clearance part 11 is favorably supplied to the bearing hole 2a of the sleeve 2 from the entire circumference via the bearing hole outer periphery minimum clearance part 12, and that the working fluid 20 is stably filled in the bearing hole 2a of the sleeve 2 is provided.

In the present invention, the communication part 27 is formed at the slightly lower position than the top surface wall portion 14a of the fluid storage space part 14 in the cover 5, and the level difference h is provided between the top surface wall portion 14a of the fluid storage space part 14 which is the back surface of the cover 5 and the upper end portion 27a (see FIG. 7) of the communication part 27, as shown in FIGS. 6B, 7 and the like. Therefore, bubbles from the circular communicating path 6 flow into the fluid storage space part 14 through the introducing minimum clearance part 11, and even when the bubbles K moves along the top surface wall portion 14a of the fluid storage space part 14 thereafter as shown in FIG. 7 and the like, the bubbles can be prevented from flowing into the communication part 27 by the aforementioned level difference h, whereby entry of the bubbles into the adhesive inflow allowing space part 26 can be prevented, and the trouble of leakage of the working fluid 20 to the outside and the like due to expansion of air at the time of temperature rise and the like can be prevented.

In the above described embodiment, the protruding ridge part 24 which protrudes upward is formed at the outer peripheral portion of the top surface of the cover 5, and therefore, when the working fluid 20 is filled after assembly of the hydrodynamic bearing device, the working fluid 20 is inhibited from dropping from the top surface of the cover 5 by the protruding ridge part 24. This enhances working efficiency, and can prevent the filling amount of the working fluid 20 into the sleeve 2 from decreasing, and therefore, reliability is enhanced.

Figure 13:
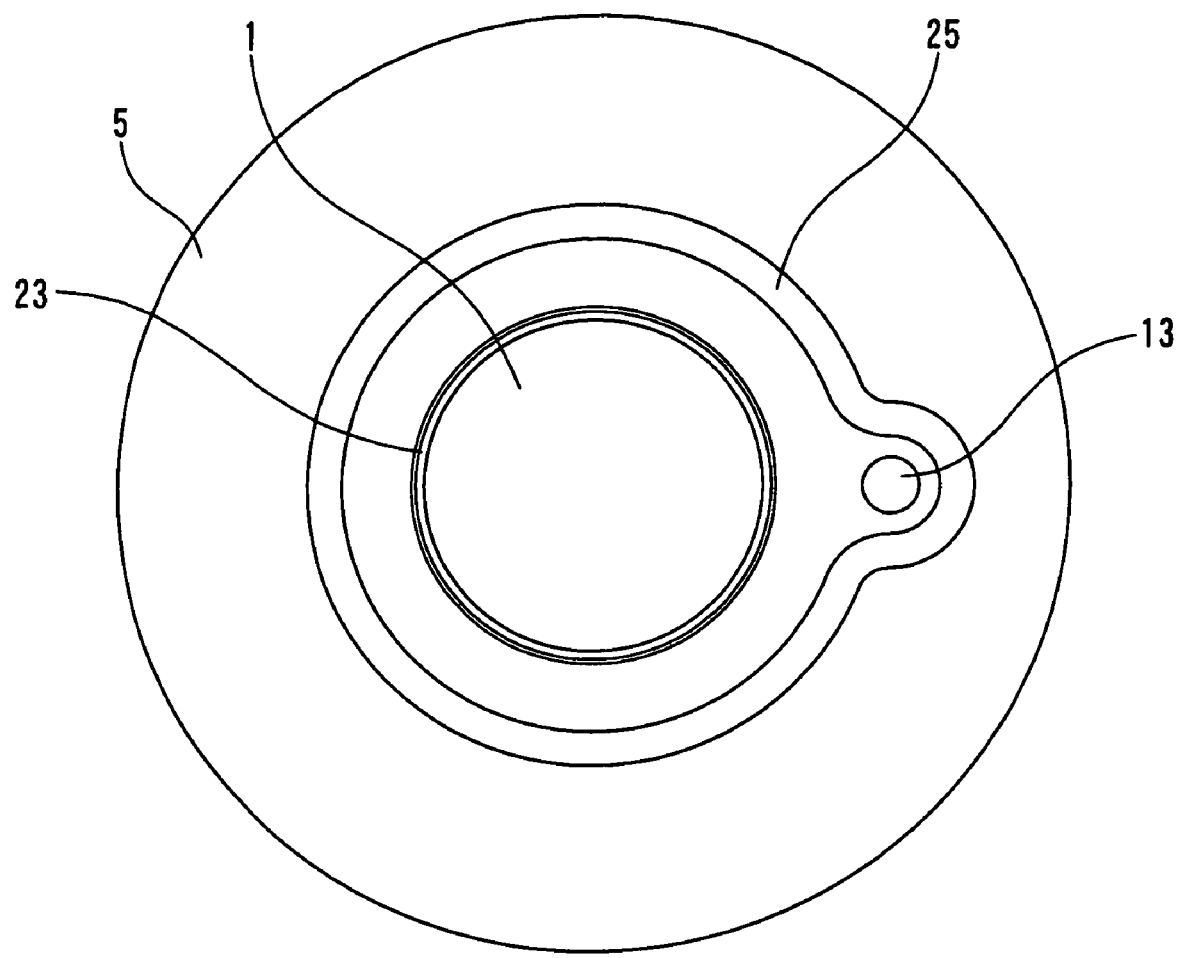
FIG. 13 is a plan view of a cover of a hydrodynamic bearing device according to another embodiment of the present invention.

As shown in FIG. 13, a trench for oil barrier 25 to be coated with an oil barrier may be formed to surround the working fluid storage part 23 and the vent hole 13 from outside in the plane view instead of providing the protruding ridge part 24, and the oil barrier may be coated on the trench for oil barrier 25, so that the working fluid 20 does not leak outside when the working fluid 20 is supplied.

Figure 14A:
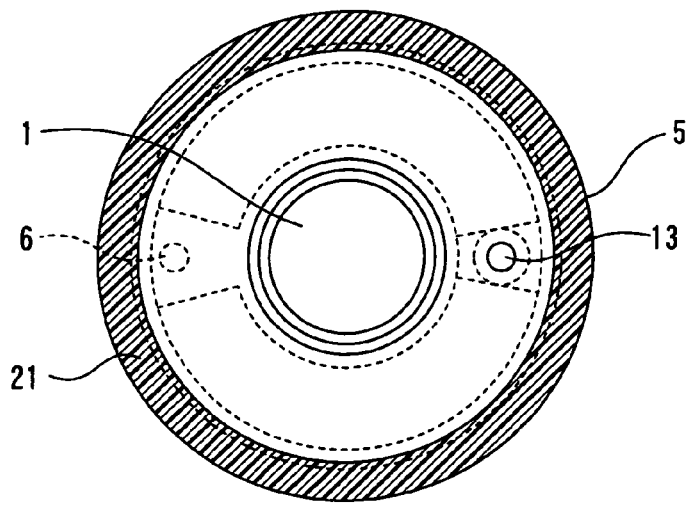
FIGS. 14A to 14C are plan views of the same hydrodynamic bearing device schematically showing the states in which the filled area and insufficient area of the adhesive are seen respectively.
Figure 14B:
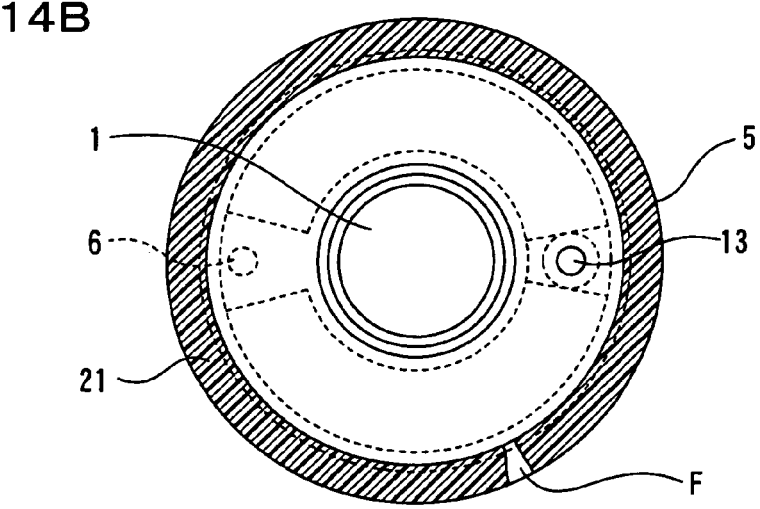
Figure 14C:
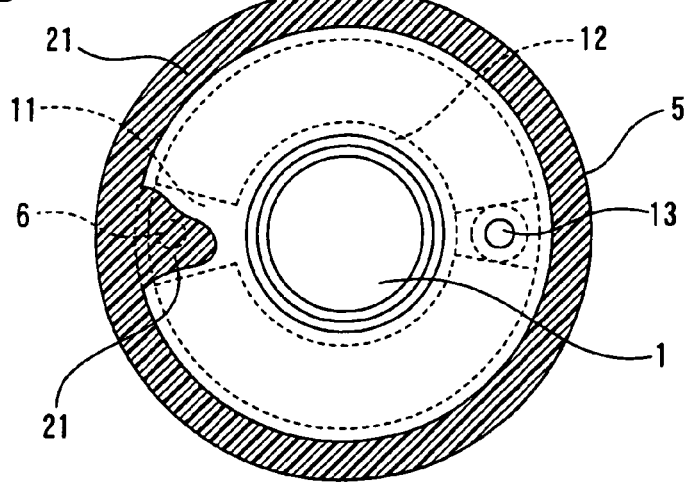

Described in the above embodiment is the case where only the filled state of the working fluid 20 is confirmed after the working fluid has been filled at the time of assembly. In addition to this, the adhesive having a color and a color density clearly recognizable even with a small amount and having a different color which can be discriminated separately from the working fluid 20 may be used as the adhesive 21, and the filled state of the adhesive 21 may be confirmed after the filling step of the adhesive 21 as shown in FIG. 14A. FIG. 14B shows the case where the adhesive 21 is insufficient in a part of the area between the flange parts 2f and 5f (insufficient part is shown by F), and FIG. 14C shows the case where the adhesive 21 flows into the introducing minimum clearance part 11 and the like. When the adhesive 21 flows into the introducing minimum clearance part 11 like this, the problem that the opening of the circular communicating path 6 is closed and the working fluid 20 cannot be circulated is caused, but according to the present invention, insufficiency of the adhesive 21 and inflow of the adhesive to the introducing minimum clearance part 11 and the like can be easily recognized visually even in such a case, and therefore, the hydrodynamic bearing device which has the possibility that the working fluid 20 leaks outside due to insufficiency of the adhesive 21, and the hydrodynamic bearing device with poor circulating function can be prevented from being shipped, thus making it possible to enhance reliability. FIGS. 14A to 14C each schematically shows the state of the hydrodynamic bearing device when filling the adhesive 21, as seen from above.

When the working fluid 20 is filled and inspected thereafter, the adhesive 21 and the working fluid 20 differ in color, and therefore, the filled state of the working fluid 20 and the presence or absence of bubbles can be confirmed by distinguishing the working fluid 20 from the adhesive 21.

As the cover 5, the case where the entire cover is made by resin-molding, and the case where a part of it which is made by metal pressing and a part of it which is made by resin-molding are combined are cited, but the cover 5 is not limited to them. In the above described embodiment, the case where the entire cover 5 has translucency is described, but the cover 5 is not limited to this, and only the fluid storage space part 14 may have translucency. In the above described embodiment, the case where the working fluid 20 circulates through the circular communicating path 6 is described, but the present invention is not limited to this, and the present invention is also applicable to the type which does not positively circulate the working fluid 20 without providing the circular communicating path 6.

Figure 15:
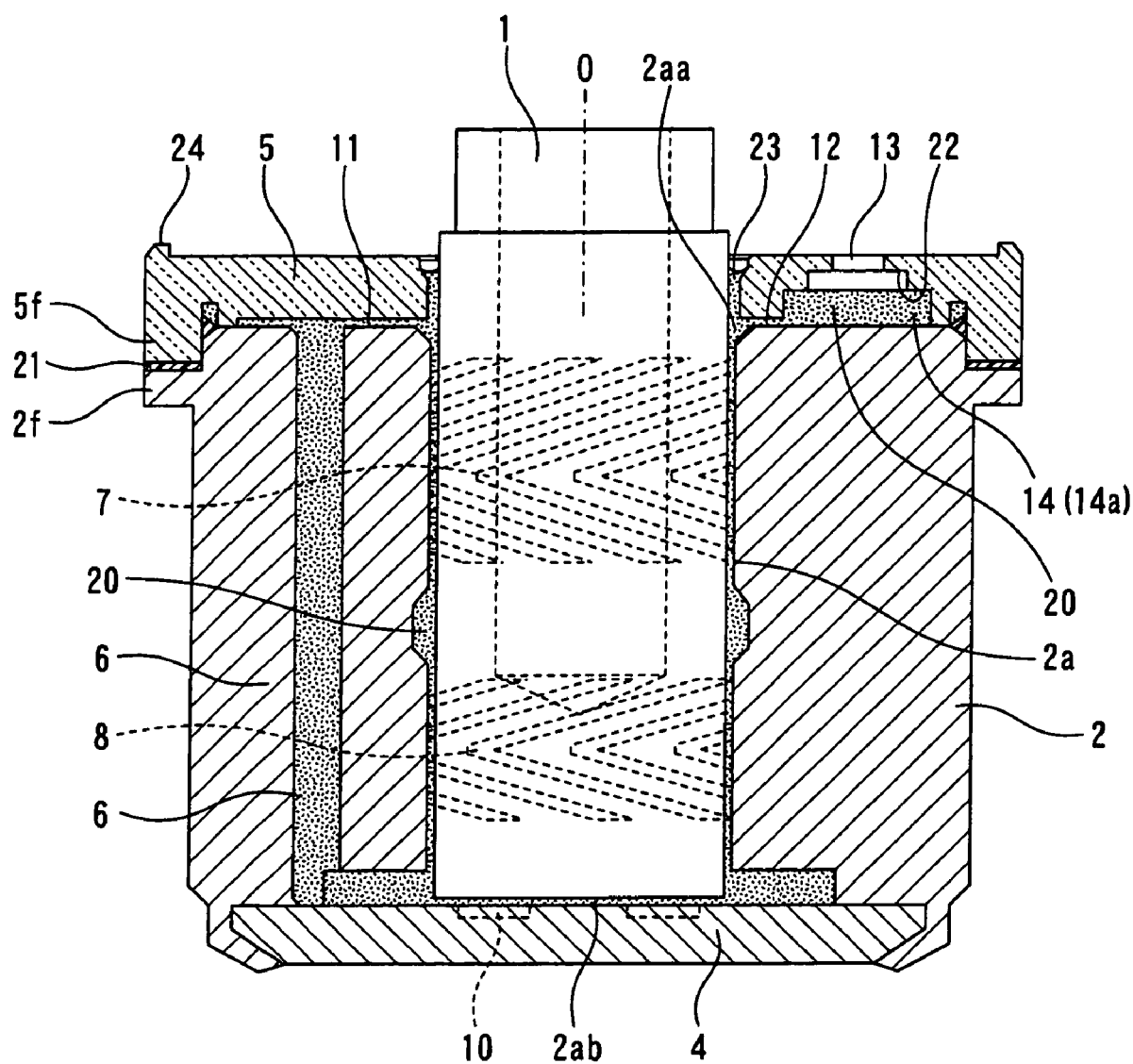
FIG. 15 is a sectional view of the same hydrodynamic bearing device according to another embodiment of the present invention.

In the above described embodiment, the case including a so-called flanged shaft having the thick thrust flange 3 at the lower end portion of the shaft 1 is described, but the present invention is not limited to this, and the present invention is also applicable to the structure in which the dynamic pressure groove for the thrust hydrodynamic bearing is formed at least one of the opposing surfaces of the lower end portion of the shaft 1 and the thrust plate 4 without having the thrust flange 3 as shown in FIG. 15, and is also applicable to the one which is restrained in position in the thrust direction with respect to the plate member which closes the closed area by a pivot part provided at the lower end portion of the shaft 1 without having the thrust flange 3, though not shown. It goes without saying that the same effect can be also obtained in the construction of a so-called flangeless shaft. However, in this case, it is necessary to provide a slipping-off prevention unit additionally.

Embodiment 2

Figure 16A:
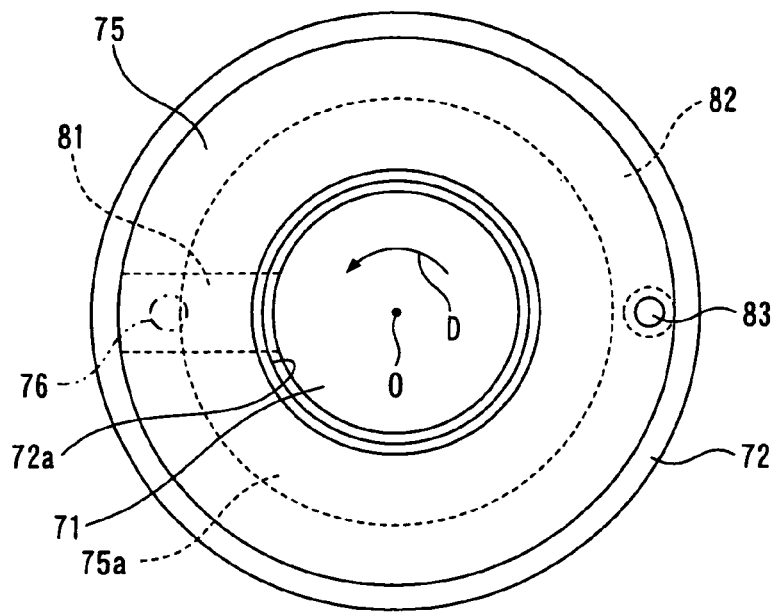
FIGS. 16A and 16B are a plan view and a sectional view of a hydrodynamic bearing device according to embodiment 2 of the present invention.
Figure 16B:
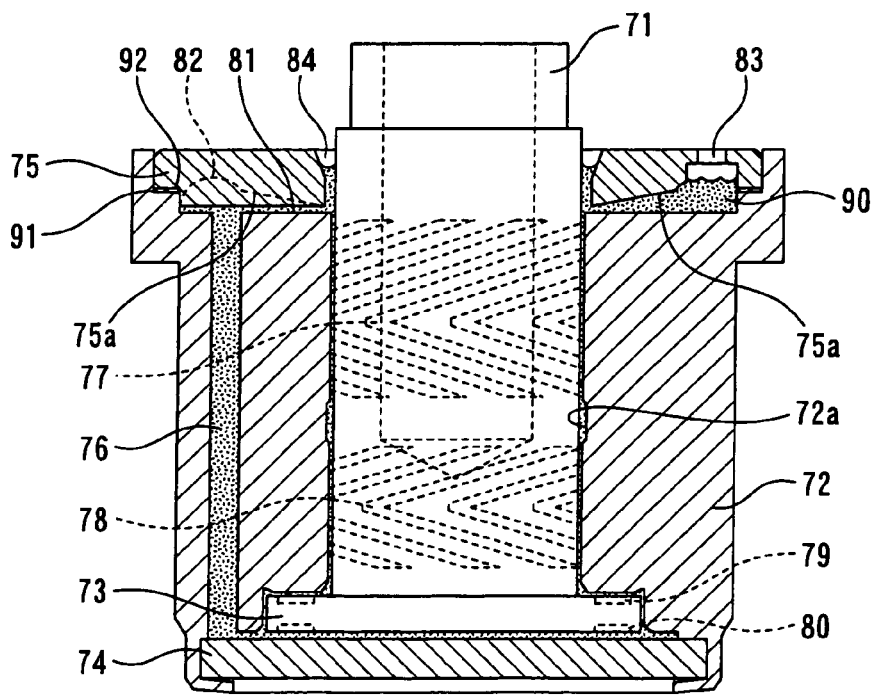

In a second embodiment, in the following explanation, a case where an open end in a bearing hole of a sleeve is at an upper position and a closed end is placed at a lower position is described as shown in FIG. 16B to facilitate the understanding, but the present invention is not limited to the posture of this placement.

Figure 16C:
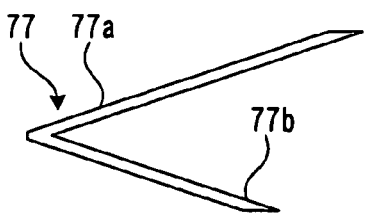
FIG. 16C is a view showing one dynamic pressure groove of the same hydrodynamic bearing device.
Figure 17:
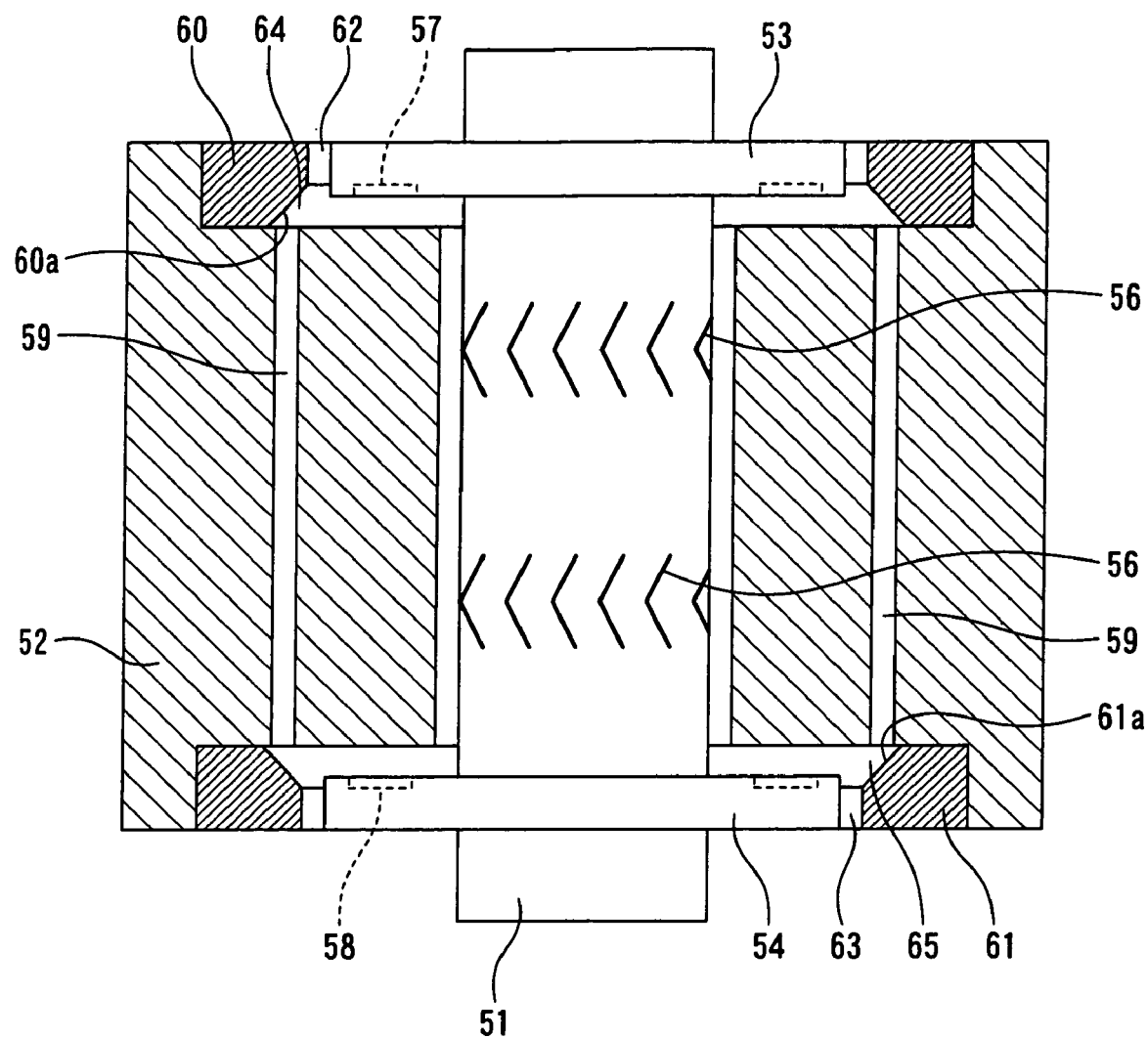
FIG. 17 is a sectional view of a conventional hydrodynamic bearing device.

As shown in FIGS. 16A to 16C, this hydrodynamic bearing device has a construction including a metal shaft 71, a metal sleeve 72 which has a bearing hole 72a having an open end at an upper side which opens and a closed end at a lower side which is closed, with the shaft 71 inserted therein in a rotatable posture via a gap (space), a thick thrust flange 73 which is provided at one end portion (a lower end portion in FIG. 16B) of the shaft 71, and is disposed in a posture having a gap with respect to an end surface near to a lower end portion of the sleeve 72, and a thrust plate 74 which is fixed to a bottom portion of the sleeve 72 to be opposed to the thrust flange 73 in a posture having a gap, and in addition to this construction, the hydrodynamic bearing device is provided with a metal cover 75 which covers the upper end surface (open end side end surface) of the sleeve 72 in a state having a gap and has a vent hole 83 communicating with external air in a part of it. In this hydrodynamic bearing device, a circular communicating path 76 extending in parallel with an axis is provided in an area near to an outer peripheral surface in the sleeve 72, and this circular communicating path 76 provides communication between a space area (space area at a closed end surface side) which a top surface of the thrust plate 74 faces and a space area between the cover 75 and the upper end surface of the sleeve 72. A working fluid 90 such as lubricating oil or ionic liquid is filled into an internal space enclosed by the sleeve 72 covered with the cover 75 and the thrust plate 74 (namely, a gap space between an outer peripheral surface of the shaft 71 and an inner peripheral surface of the sleeve 72, a gap space between the thrust flange 73 and a bottom surface of and a thick inner peripheral surface in the vicinity to the sleeve 72 opposed to the thrust flange 73, a gap space between the thrust flange 73 and the thrust plate 74, a space in the circular communicating path 76, a space between the upper end surface of the sleeve 72 and the cover 75 (a vent hole area is excluded)). Reference numeral 84 in FIG. 16B denotes a working fluid storage part which is formed in the inner peripheral surface of the cover 75 facing the shaft 71 to be wider toward the open side, communicates with external air and stores the working fluid 90.

Two dynamic pressure grooves 77 and 78 are formed at an upper and a lower positions on the inner peripheral surface of the sleeve 72 (or may be provided on an outer peripheral surface of the shaft 71, or on both the inner peripheral surface of the sleeve 72 and the outer peripheral surface of the shaft 71), and when the shaft 71 and the sleeve 72 are relatively rotated by a rotational driving force of a motor not shown, a radial hydrodynamic bearing in which the shaft 71 and the sleeve 72 are rotatably supported via a predetermined gap in a radial direction (radius direction) is constructed by the power of the working fluid 90 raked by the dynamic pressure grooves 77 and 78. Dynamic pressure grooves 79 and 80 are formed on a top surface and a bottom surface of the thrust flange 73 (or may be provided on an opposing bottom surface of the sleeve 72 and a top surface of the thrust plate 74, or on all of the top and bottom surfaces of the thrust flange 73, the bottom surface of the sleeve 72 and the top surface of the thrust plate 74), and when the thrust flange 73 mounted to the shaft 71 and the sleeve 72 are relatively rotated by the aforementioned rotational driving force or the like, a thrust hydrodynamic bearing in which the thrust flange 73 and the sleeve 72 and the thrust plate 74 are rotatably supported via a predetermined gap in a thrust direction (axial direction) is constructed by the power of the working fluid 90 raked by the dynamic pressure grooves 79 and 80. Here, the dynamic pressure grooves 77 and 78 which construct the radial hydrodynamic bearing are in the well-known herring-bone shape, and formed at two areas at the upper side and the lower side in the outer peripheral surface of the shaft 72. In the lower dynamic pressure groove 78, grooves formed diagonally upward from their apexes and the grooves formed diagonally downward therefrom are in the same lengths, while in the upper dynamic pressure groove 77, as shown in FIG. 16C, a groove 77a formed diagonally upward from its apex is formed to be longer than a groove 77b formed diagonally downward form its apex. At the time of rotational drive, the working fluid 90 in this gap is positively fed downward by the upper dynamic pressure groove 77.

The upper end surface in the sleeve 72, which is opposed to the cover 75, is in a planar shape. On the other hand, the cover 75 has its back surface portion (surface opposed to the upper end surface of the sleeve 72) placed so that in its area near the opening of the circular communicating path 76 opened in the upper end surface of the sleeve 72, a gap through which the fluid flows into the bearing hole 72a of the inner peripheral surface of the sleeve 72 by capillarity (called an introducing minimum clearance part 81) is formed. The introducing minimum clearance part 81 is formed to continue to the open end of the bearing hole 72a of the sleeve 72 from the area near the opening of the circular communicating path 76 as shown in FIG. 16A. As shown by the dotted line in FIG. 16B, the area other than the aforementioned introducing minimum clearance part 81 in the back surface portion of the cover 75 is formed into a recessed shape so that a fluid storage space part 82 which is recessed significantly upward in the area near to the outer periphery is formed, and an inclined surface 75a which is recessed to be inclined so that a gap from the upper end surface becomes gradually smaller toward the center in the radius direction from the fluid storage space part 82 is formed. The fluid storage space part 82 and the area facing the inclined surface 75a are formed to be large in size which does not cause capillarity to be able to store the working fluid 90. A vent hole 83 which communicates with external air is provided at an area opposite from the opening of the circular communicating path 76 with the axis 0 as a center in the plane view. Reference character D in FIG. 16A denotes a rotational direction of the shaft 71.

In this construction, when the shaft 71 and the sleeve 72 are relatively rotated by the rotational driving force and the like of the motor not shown, the shaft 71 is supported with a predetermined gap kept with respect to the sleeve 72 by the power of the working fluid 90 raked by the dynamic pressure grooves 77 and 78 of the radial hydrodynamic bearing, and by the power of the working fluid 90 raked by the dynamic pressure grooves 79 and 80 of the thrust hydrodynamic bearing. The working fluid 90 between the shaft 71 and the sleeve 72 is fed downward by the power of the working fluid 90 raked by the dynamic pressure groove 77 of the radial hydrodynamic bearing at the upper side, and with this, the working fluid 90 passes through the space between the thrust flange 73 and the sleeve 72, the space between the sleeve 72 and the thrust plate 74, the space in the circular communicating path 76, the introducing minimum clearance part 81 in sequence, and flows into the space between the shaft 71 and the sleeve 72 again, and the working fluid 90 positively circulates through these spaces. A part of the working fluid 90 introduced into the introducing minimum clearance part 81 from the circular communicating path 76 flows into the space between the shaft 71 and the sleeve 72 again while flowing into the fluid storage space part 82.

Accordingly, even when bubbles attach to the dynamic pressure grooves 77 and 78 of the radial hydrodynamic bearing and the dynamic pressure grooves 79 and 80 of the thrust hydrodynamic bearing, and the like, the bubbles detach from the dynamic pressure grooves 77 and 78, the dynamic pressure grooves 79 and 80 and the like and circulate by the aforementioned circulating flow, and the bubbles are separated from the working fluid and released from the vent hole 83 when the bubbles pass through the introducing minimum clearance part 81 from the circular communicating path 76, and flow into the fluid storage space part 82. Thus, according to this construction, the bubbles in the working fluid are released at the normal rotational driving time, as a result of which, reduction in the bearing stiffness due to the bubbles, reduction in the bearing performance such as instability of rotation at the time of rotating operation can be prevented.

According to the hydrodynamic bearing device, not only the working fluid storage part 84 is provided in the inner peripheral surface facing the shaft 71 of the cover 75, but also the fluid storage space part 82 with a large capacity is provided between the sleeve 72 and the cover 75. Accordingly, even when the working fluid 90 of the fluid storage space part 82 decreases due to evaporation or the like, the circulating function can be maintained as long as the working fluid is filled in the introducing minimum clearance part 81, and therefore, the advantage of being capable of maintaining the bearing performance favorable for an extremely long time and capable of increasing useful life is provided.

The cover 75 is fixed to the top surface portion of the sleeve 72 via an adhesive 91. Namely, as shown in FIG. 16B, a step part 92 to which the cover 75 is fitted is formed on the top surface portion of the sleeve 72. After the adhesive 91 is applied to the entire periphery of the step part 92 and the cover 75 is fixed to the top surface portion of the sleeve 72, the working fluid 90 is filled into the inside of the sleeve 72 covered with the cover 75 in a state in which the hydrodynamic bearing device is placed in a vacuum chamber and air is purged therefrom.

In this embodiment, the gas-to-liquid boundary line of the working fluid and air increases and decreases in the radius direction. Therefore, by making the cover 75 of a material with translucency, the filled amount of the working fluid can be visually recognized by its area, and thus, proper management of the working fluid is possible.

The hydrodynamic bearing device of the present invention is especially preferable as a spindle motor for a disk drive apparatus, a reel drive apparatus, a capstan drive apparatus, a drum drive apparatus or the like, but the present invention is not limited to this.

What is claimed is:

1. A hydrodynamic bearing device comprising:
a shaft;
a sleeve for supporting a shaft, such that a gap exists between the sleeve and the shaft;
a cover fixed to said sleeve, for covering an end surface of said sleeve, such that a space exists between the sleeve and the cover;
dynamic pressure grooves on at least one surface of said shaft and said sleeve, such that an outer peripheral surface of the shaft is opposite an inner peripheral surface of the sleeve, said dynamic pressure grooves for supporting said shaft with respect to said sleeve, such that the shaft is rotatable; and
a working fluid in spaces adjacent to the sleeve including a space between said cover and said sleeve,
wherein at least a part of the cover is translucent, and
the cover is shaped such that a fluid-filled space between the cover and the sleeve gradually becomes deeper along a circumferential direction.

2. The hydrodynamic bearing device according to claim 1, wherein at least a part of said cover is composed of a polyether-imide resin.

3. The hydrodynamic bearing device according to claim 1, wherein the working fluid is colored.

4. The hydrodynamic bearing device according to claim 1, wherein the cover is fixed to the sleeve by an adhesive, and the adhesive is of a color that is different from that of the working fluid.

5. The hydrodynamic bearing device according to claim 1, wherein the dynamic pressure grooves are in a shape which applies a circulating force to the working fluid.

6. The hydrodynamic bearing device according to claim 1, wherein said hydrodynamic bearing device is used for a spindle motor.

7. The hydrodynamic bearing device according to claim 1, wherein a location on the cover where the fluid-filled portion is deepest comprises a vent hole.

8. A hydrodynamic bearing device comprising:
a shaft,
a sleeve having a bearing hole, said hole being open at one end and closed at the other end, said shaft located in the bearing hole such that a gap exists between the sleeve and the shaft, and the shaft is rotatable, and
a cover fixed to said sleeve and covering a first end surface of said sleeve, such that a space exists between the cover and the sleeve,
radial dynamic pressure grooves in at least one of an outer peripheral surface of said shaft and an inner peripheral surface of said sleeve, at a location where said shaft and said sleeve face each other, said grooves for supporting said shaft in a radial direction without contact, such that the shaft is rotatable with respect to said sleeve,
a communicating path in said sleeve, for providing communication between a space adjacent the closed end of the sleeve and a space adjacent to the open end, the space adjacent to the open end being located between said cover and the open end of said sleeve, and
a working fluid in spaces adjacent to the sleeve including the space adjacent to the open end between said cover and said sleeve,
whereby when said shaft is rotated with respect to said sleeve, the working fluid is circulated through a first space between said shaft and said sleeve, the space adjacent to said closed end side which communicates with the first space, the communicating path communicating with the space adjacent to the closed end side, and the space adjacent to the open end between said cover and said sleeve, which communicates with this communicating path,
wherein at least a part of the cover is translucent, and
the cover is shaped such that a fluid-filled space between the cover and the sleeve gradually becomes deeper along a circumferential direction.

9. The hydrodynamic bearing device according to claim 8, wherein at least a part of said cover is composed of a polyether-imide resin.

10. The hydrodynamic bearing device according to claim 8, wherein the working fluid is colored.

11. The hydrodynamic bearing device according to claim 8, wherein the cover is fixed to the sleeve by an adhesive, and the adhesive is of a color which is different from that of the working fluid.

12. The hydrodynamic bearing device according to claim 8, wherein the radial dynamic pressure grooves are in a shape which applies a circulating force to the working fluid.

13. The hydrodynamic bearing device according to claim 8, wherein the space adjacent to the closed end of the sleeve comprises a thrust flange fixed to a tip the shaft, and wherein an opening of the communicating path at said closed end communicates with a space facing the thrust flange.

14. The hydrodynamic bearing device according to claim 8, wherein the space adjacent to the closed end surface in the sleeve comprises a tip end of the shaft and closing plate adjacent the closed end, and wherein the opening of the communicating path adjacent to said closed end in the sleeve communicates with a space facing the tip end of the shaft.

15. The hydrodynamic bearing device according to claim 8, wherein said hydrodynamic bearing device is used for a spindle motor.

16. The hydrodynamic bearing device according to claim 8, wherein a location on the cover where the fluid-filled portion is deepest comprises a vent hole.

* * * * *